United States Patent
Arifin et al.

(10) Patent No.: US 8,758,632 B2
(45) Date of Patent: Jun. 24, 2014

(54) RADIAL FLOW COLUMN

(75) Inventors: Davis Yohanes Arifin, Singapore (SG); Kok Wee Henry Lim, Singapore (SG); Karthikeyan Sathrugnan, Singapore (SG); Richard Woodling, Singapore (SG)

(73) Assignee: Evoqua Water Technologies LLC, Alpharetta, GA (US)

( * ) Notice: Subject to any disclaimer, the term of this patent is extended or adjusted under 35 U.S.C. 154(b) by 406 days.

(21) Appl. No.: 13/070,555

(22) Filed: Mar. 24, 2011

(65) Prior Publication Data

US 2011/0233153 A1  Sep. 29, 2011

(30) Foreign Application Priority Data

Mar. 25, 2010 (AU) .............................. 2010901265
Jun. 25, 2010 (AU) .............................. 2010902825

(51) Int. Cl.
*B01D 24/08* (2006.01)
(52) U.S. Cl.
USPC ........... 210/807; 210/289; 210/351; 210/442; 210/502.1
(58) Field of Classification Search
USPC ......... 210/287, 288, 289, 350, 351, 352, 442, 210/502.1, 770, 807, 138, 778; 100/126, 100/127, 211
See application file for complete search history.

(56) References Cited

U.S. PATENT DOCUMENTS

| | | | |
|---|---|---|---|
| 2,190,305 A * | 2/1940 | Auberschek ................. 210/351 |
| 2,626,675 A * | 1/1953 | Maher .............................. 96/144 |
| 2,742,155 A * | 4/1956 | Sather ............................. 210/97 |
| 4,021,339 A | 5/1977 | Foody | |
| 4,157,959 A | 6/1979 | Wen et al. | |
| 4,280,913 A * | 7/1981 | Applegate et al. ............ 210/669 |
| 4,533,472 A * | 8/1985 | Verri et al. ..................... 210/350 |
| 4,540,489 A | 9/1985 | Barnard | |
| 4,627,918 A | 12/1986 | Saxena | |
| 4,687,577 A * | 8/1987 | Reuter et al. .................. 210/288 |
| 4,913,815 A | 4/1990 | Shulda | |

(Continued)

FOREIGN PATENT DOCUMENTS

DE 4135018 6/1992
EP 0568940 11/1993

(Continued)

OTHER PUBLICATIONS

International Search Report and Written Opinion from corresponding International Application No. PCT/US2011/29699 dated May 31, 2011.

(Continued)

*Primary Examiner* — Matthew O Savage

(57) ABSTRACT

Aspects and embodiments of the present invention are directed to apparatus and methods of filtering a fluid to reduce a level of at least one contaminant therein. The filtering of the fluid may be accomplished with a radial flow filtration column comprising a fluid chamber having an inlet, an outlet, and a side wall, an inner permeable retainer positioned in the fluid chamber, an outer permeable retainer positioned in the fluid chamber spaced apart from and surrounding the inner permeable retainer, a media bed compartment formed between the inner permeable retainer and the outer permeable retainer, and an adjustable element biased into the media bed compartment and configured to maintain a predetermined packing density of a media bed to be disposed within the media bed compartment.

17 Claims, 21 Drawing Sheets

(56) References Cited

U.S. PATENT DOCUMENTS

| | | | |
|---|---|---|---|
| 4,997,465 A | 3/1991 | Stanford | |
| 5,484,532 A | 1/1996 | Rice | |
| 5,597,489 A | 1/1997 | Schneider et al. | |
| 5,667,675 A | 9/1997 | Hatch et al. | |
| 6,852,232 B2 | 2/2005 | Martin | |
| 7,261,816 B2 * | 8/2007 | Suzuki et al. | 210/282 |
| 2003/0213756 A1 * | 11/2003 | Duby | 210/791 |
| 2005/0056582 A1 * | 3/2005 | Patel et al. | 210/266 |
| 2006/0207925 A1 | 9/2006 | Levy | |
| 2009/0110617 A1 | 4/2009 | Koves | |

FOREIGN PATENT DOCUMENTS

| | | |
|---|---|---|
| GB | 1052221 | 12/1966 |
| GB | 1435608 A | 5/1976 |
| WO | 9626904 | 9/1996 |
| WO | 2006029071 | 3/2006 |
| WO | 0002655 | 1/2008 |

OTHER PUBLICATIONS

Gustavsson, P. et al, "Continuous Superporous Agarose Beds in Radial Flow Columns," J. of Chromatography A, Jan. 2001, vol. 925, Issue 1, pp. 69-78.

Munson-McGee, Stuart H., "Fluid Dynamics of Radial-Flow Ion Exchange in Partially Filled Columns," Separation Science and Technology, vol. 35, Issue Nov. 15, 2000, pp. 2415-2429.

Shields, K., "Development of a Radial Flow Condensate Polisher Pilot Scale Test Vessel Design Specification," Final Report, EPRI, Sep. 2004.

* cited by examiner

RADIAL FLOW COLUMN

RELATED APPLICATIONS

Foreign priority benefits are claimed under 35 U.S.C. §119(a)-(d) or 35 U.S.C. §365(b) of Australian provisional application number 2010901265, filed Mar. 25, 2010, and Australian provisional application number 2010902825, filed Jun. 25, 2010.

FIELD OF THE INVENTION

Aspects and embodiments of the present invention relates to methods and apparatus for water treatment using a radial flow column. In particular, aspects and embodiments of the present invention relate to improvements in packing filtration media, to methods of auto-adjusting packing density of filtration media, to methods of selecting appropriate dimensions for radial flow column filtration media beds, and to improved methods of operating radial flow columns for waste water filtration.

BACKGROUND

It is well known to treat water, for example, waste water containing potentially harmful contaminants, by passing it through contaminant-removing filtration media (also referred to herein as "sorbent," filter media," or simply "media") which has been packed into an elongate axial flow column. The contaminant-removing media forms a porous matrix through which the contaminated water flows. The path of the water is generally linear, along the axis of the filtration column with the downward flow of the water taking place under the force of gravity. As the contaminated water passes through the contaminant-removing media, contaminants in the water are removed. The contaminant-removing media may extract particular contaminants of interest via a number of different mechanisms such as absorption, adsorption, ion exchange, affinity, hydrophilic interactions, hydrophobic interactions, size exclusion, and other mechanisms known to those skilled in the art.

Axial flow columns are generally cylindrical and include an inlet at one end of the column and an outlet at the other. When used for commercial purposes, very large columns are sometimes required, with some commercial axial flow columns being, for example, as high as about six meters with a diameter of about three meters.

A problem can occur when increasing the throughput of an axial flow column. The combination of a high flow rate and a large bed height may result in a high pressure drop across the media. This may result in compression of the media which adversely affects the flow patterns through the column. In some areas, flow may be reduced almost to zero, while in other areas, compression of the media can result in the formation of channels in the media which facilitate the passage of contaminated water and greatly reduce the contaminant removal performance of the axial flow column.

One solution to the problems associated with axial flow columns is provided in U.S. Pat. No. 5,597,489, which discloses a radial flow column for water treatment. A radial flow column includes a fluid chamber which has cylindrical inner and outer screens positioned therein. A contaminant-removing media is packed in a media bed between the inner and outer screens. Contaminated water enters the column, and contacts the outer screen. The contaminated water then moves inward through the filtration media towards the inner screen where the treated water exits into the central lumen of the radial flow column. The filtered water can then be removed from the radial flow column through the central lumen.

FIG. 1 shows a longitudinal section of a radial flow column such as disclosed in U.S. Pat. No. 5,597,489. The outer casing 1 contains an outer mesh screen 2 and an inner mesh screen 3 and a filtration media 4 disposed between the inner and outer mesh screens. When viewed in a horizontal sectional plane, the filtration bed is annular in nature. The inner mesh screen 3 defines the lumen 5 of the device. Water enters the device at an inlet 6 and passes into the annular space 7 surrounding outer mesh screen 2. The water then passes through the outer mesh screen 2, filtration media 4, and inner mesh screen 3 before being taken off via the lumen 5 and exiting the device at the output 8.

In devices such as that illustrated in FIG. 1, any deficiencies in the filtration media, for example, variations in the packing density of the media from one portion of the media bed to another, can lead to the formation of channels in the media bed. These channels may be undesirable because they allow for the passage of contaminants through the filtration bed and directly into the treated water. This can result in contaminants being either discarded into the environment or, if the filtration device is being used for drinking water filtration, unknowingly consumed.

Additionally, the nature of the flow in radial flow columns is considerably more complex than those in simple axial columns and so, accordingly, there is a need in the art for a more rational basis on which to design and construct radial flow columns.

SUMMARY

According to an aspect of the invention there is provided a radial flow column. The radial flow column comprises a fluid chamber having an inlet, an outlet, and a side wall, an inner permeable retainer positioned in the fluid chamber, an outer permeable retainer positioned in the fluid chamber spaced apart from and surrounding the inner permeable retainer, a media bed compartment formed between the inner permeable retainer and the outer permeable retainer, and an adjustable element biased into the media bed compartment and configured to maintain a predetermined packing density of a media bed to be disposed within the media bed compartment.

In some embodiments, the inner permeable retainer and the outer permeable retainer are concentric.

In some embodiments, the radial flow column further comprises an intermediate permeable retainer spaced apart from and surrounding the inner permeable retainer and spaced apart from and surrounded by the outer permeable retainer.

In some embodiments, the radial flow column further comprises an inner flow chamber defined by an inner wall of the inner permeable retainer and having a first inlet at a first end of the inner flow chamber and a second inlet at a second end of the inner flow chamber.

In some embodiments, the adjustable element is an inflatable bladder. The bladder may extend across a space bounded by the inner permeable retainer and the outer permeable retainer. The bladder may be internally pressurized to maintain sealing engagement with an upper surface of the media bed.

In some embodiments, the adjustable element is a resiliently biased plunger. A face of the plunger may be maintained in sealing engagement with the upper surface of the media bed. The sides of the plunger may be configured to contact the inner permeable retainer and the outer permeable retainer. The sides of the plunger may comprise a plurality of resilient elements.

In some embodiments, the radial flow column further comprises a media bed disposed in the media bed compartment including a first layer of media having a first composition and a second layer of media having a second composition different from the first composition.

In some embodiments, the radial flow column further comprises a media bed including a sorbent and a filtration aid. The filtration aid may have a lower density than the sorbent. The filtration aid is formed from a diatomaceous earth. The media bed may include the sorbent and the filtration aid in a ratio of about 1:1 by weight.

According to another aspect of the invention there is provided a radial flow column. The radial flow column comprises a fluid chamber having a side wall, a first inner permeable retainer, a first outer permeable retainer surrounding the first inner permeable retainer and spaced apart from the first inner permeable retainer, a first media bed compartment formed between the first inner permeable retainer and the first outer permeable retainer, a second inner permeable retainer, a second outer permeable retainer surrounding the second inner permeable retainer and spaced apart from the second inner permeable retainer, a second media bed compartment formed between the second inner permeable retainer and the second outer permeable retainer and disposed axially inwardly of the first media bed compartment, a first fluid passageway defined by the second inner permeable retainer, a second fluid passageway formed between the first media bed compartment and the side wall of the fluid chamber; and a third fluid passageway formed between the second media bed compartment and the first media bed compartment.

According to another aspect of the invention there is provided a method of facilitating removal of a contaminant from a contaminated water stream. The method comprises providing a radial flow column. The radial flow column includes a fluid chamber having a side wall, an inner permeable retainer positioned in the fluid chamber, an outer permeable retainer positioned in the fluid chamber spaced apart from and surrounding the inner permeable retainer and defining an outer chamber between the outer permeable retainer and the side wall, a media bed compartment formed between the inner permeable retainer and the outer permeable retainer, an adjustable element biased into the media bed compartment and configured to maintain a predetermined packing density of the media bed, and a flow chamber defined by the inner permeable retainer.

According to another aspect of the invention there is provided a method of treating feed water containing at least one contaminant species. The method comprise providing a source of feed water and connecting the source of feed water to an inlet of a radial flow column. The radial flow column includes a fluid chamber having a side wall, an inner permeable retainer positioned in the fluid chamber, an outer permeable retainer positioned in the fluid chamber spaced apart from and surrounding the inner permeable retainer and defining an outer chamber between the outer permeable retainer and the side wall, a media bed compartment formed between the inner permeable retainer and the outer permeable retainer, a media bed disposed in the media bed compartment, an adjustable element biased into the media bed compartment and configured to maintain a predetermined packing density of the media bed, and a fluid flow passageway defined by the inner permeable retainer. The method further comprises passing the feed water from the inlet into the fluid flow passageway, passing the feed water radially outwardly from the fluid flow passageway through the media bed and into the outer chamber to produce decontaminated water, and removing the decontaminated water from the outer chamber.

The method may further comprise introducing the feed water at both a first end and a second end of the fluid flow passageway.

According to another aspect of the invention there is provided a radial flow column. The radial flow column comprises a fluid chamber, a cylindrical inner permeable retainer, and a cylindrical outer permeable retainer surrounding the inner permeable retainer. The fluid chamber has an inlet, an outlet, and a side wall. The inner and outer permeable retainers are positioned in the fluid chamber. The inner permeable retainer and the outer permeable retainer are spaced apart from one another and define a compartment for holding a media bed therebetween. An adjustable element is biased into the compartment for holding a media bed and configured to maintain a predetermined packing density within a media bed disposed within the compartment.

The permeable retainer may be a screen, or it may be any other suitable material adapted to retain the media bed while permitting the flow of fluids in and out to of the bed. For example, the permeable retainer may be a mesh, a frit, a membrane, a woven or non-woven fabric, or a porous ceramic.

The adjustable element may be an expandable or extensible element.

In one embodiment, the adjustable element comprises a bladder. In some embodiments, the bladder is an annular flexible bladder disposed on and in contact with an upper surface of the media bed. The bladder may substantially or fully extend across the space bounded by the inner and outer permeable retainers. In some embodiments, the bladder is inflatable, for example, by the introduction of a fluid such as air or water, generally under pressure.

In one embodiment the bladder is internally pressurized to maintain close contact with an upper surface of the media bed. The bladder may be sealingly engaged with an upper surface of the media bed. The bladder may be maintained under pressure to provide automatic self-inflation and to facilitate close contact between a surface of the bladder and an upper surface of the media bed. In some embodiments, the bladder is maintained under pressure to provide an automatic self-inflating surface that ensures close contact with an upper surface of the media bed if and when the media bed volume decreases due to media loss, settlement, or other reasons.

In another embodiment, the volume-adjustable element comprises a resiliently biased plunger. The face of the plunger is maintained in close contact with the upper surface of the media bed. The face of the plunger may be sealingly engaged with an upper surface of the media bed.

The plunger is in some embodiments annular and extends substantially or fully across the space bounded by the permeable retainers. The plunger acts under biasing to press down upon the surface of the media bed, and to seal the bed above the level of the media so as to reduce or prevent any flow through the column which is not passed through the media bed. The sides of the plunger are in some embodiments configured to wipe, scrape, or scrub the inner and outer permeable retainers as the plunger moves towards the media bed. The portion of the plunger configured to wipe, scrape, or scrub the inner and outer permeable retainers may be formed from a resilient material such as plastic or rubber, in the form of, for example, one or more annular scrapers or fins.

In some embodiments, the portion of the plunger configured to wipe, scrape or scrub the inner and outer permeable retainers has side portions in the form of a plurality of graded wiping elements. In some embodiments, the leading wiping element is sized to provide a clearance from the permeable retainers so larger pieces of media adhering to the permeable retainers are removed as the plunger moves to compact the media bed. The subsequent wiping element has a slightly smaller clearance, and removes slightly smaller pieces of media and so on until the final wiping element has little or no practical clearance from the permeable retainers.

By using wiping elements of increasing diameter, media particles can be removed from the permeable retainers as the media bed is compressed.

It will be appreciated by those skilled in the art that aspects and embodiments of the present invention are suitable for use with any type of particulate media.

In a further embodiment, the invention provides a filtration unit which comprises a sorbent, such as metal sorbent, blended with a filtration extender (also referred to herein as a "filtration aid"). In one particular embodiment, the metal sorbent is a heavy metal sorbent such as Chromosorb® sorbent media (QSR), available from Advanced Minerals Corporation, Santa Barbara, Calif. However, other sorbents can be used, such as nanocrystalline titania, metal hydroxide powder, powdered activated carbon, chitosan powder, nanoparticle media (iron hydroxide, titanium dioxide, alumina), ion exchange resins, chelating resins, etc. The sorbent can be in any suitable form, or of any particular size with any desired surface area.

The filtration extender may be, for example, diatomaceous earth, such as Celpure® high purity diatomite filter media, available from Advanced Minerals Corporation, Santa Barbara, Calif. The filtration extender may be added to the filtration media or sorbent in any amount. For example, the filtration extender may be added in an amount of about 50% by weight to provide a 1:1 ratio (by weight) of sorbent to filtration extender. In other embodiments a filtration extender may be added to filtration media in greater or lesser amounts.

According to another aspect the invention there is provided a radial flow column. The radial flow column comprises a fluid chamber, a cylindrical inner to permeable retainer, and a cylindrical outer permeable retainer surrounding the inner permeable retainer. The fluid chamber has an inlet, an outlet, and a side wall. The inner and outer permeable retainers are positioned in the fluid chamber. The inner permeable retainer and the outer permeable retainer are spaced apart from one another and define a compartment for holding a media bed therebetween. The radial flow column further comprises a media bed comprising a sorbent and a filtration aid.

In a further embodiment, the invention provides a filtration unit in which the media is packed at a controlled pressure. Any suitable pressure may be used, depending upon the intended use and properties of the media (for example, the nature, size and compressibility of the chosen media). In some embodiments, the pressure may be less than about 25 psig or even as low as between about 1 psig and about 3 psig. The term psig refers to pounds per square inch gauge, which is the amount of pressure over the existing atmospheric pressure. The media may comprise a metal sorbent mixed with a filtration aid. The metal sorbent may be a heavy metal sorbent such as Chromosorb® sorbent media. The filtration aid may be a diatomaceous earth, such as Celpure® diatomite filter media. The filtration aid may comprise a biogenic diatomaceous earth. The filtration aid may be added to the filtration media or sorbent in any amount. In some embodiments the filtration aid is added in an amount of about 50% by weight to provide a ration of about 1:1 (by weight) of sorbent to filtration aid, however, the filtration aid may be present in greater or lesser amounts, depending upon factors such as the target contaminant or desired media bed packing density.

According to another aspect of the invention there is provided a radial flow column. The radial flow column comprises a fluid chamber, a cylindrical inner permeable retainer, and a cylindrical outer permeable retainer surrounding the inner permeable retainer. The inner permeable retainer and the outer permeable retainer are coaxial or substantially coaxial and parallel or substantially parallel. The fluid chamber has an inlet, an outlet, and a side wall. The inner and outer permeable retainers are positioned in the fluid chamber. The inner permeable retainer and the outer permeable retainer are spaced apart from one another and define a compartment for holding a media bed therebetween. The media is packed at a controlled pressure.

According to another aspect of the invention there is provided a radial flow column. The radial flow column comprises a fluid chamber, a cylindrical inner permeable retainer, and a cylindrical outer permeable retainer surrounding the inner permeable retainer. The fluid chamber has an inlet, an outlet, and a side wall. The inner and outer permeable retainers are positioned in the fluid chamber. The inner permeable retainer and the outer permeable retainer are spaced apart from one another and define a compartment for holding a media bed therebetween. The media comprises a metal sorbent with a filtration aid. The media is packed at a controlled pressure.

In another aspect the invention provides a method of improving or optimizing the design of a radial flow column through sizing the components thereof to achieve a desired ratio of radial velocity, kinetic (adsorption) rate constant, and inner and outer radial dimensions of the filtration bed.

More particularly, the method of involves sizing components of a radial flow column to achieve at least a desired level, or to minimize the dimensionless constant:

$$\Psi \sim \frac{\ln(R_2/R_1)}{2k}\left[1 + \frac{2R_1}{(R_2 - R_1)}\right]$$

where $R_1$ and $R_2$ are the inner and outer radii respectively of an annular cylindrical media bed and k is a constant.

Some aspects and embodiments of the invention provide a radial flow column constructed according to the above principles.

According to another aspect of the invention there is provided a radial flow column. The radial flow column comprises a fluid chamber, a first cylindrical inner permeable retainer, and a first cylindrical outer permeable retainer surrounding the first inner permeable retainer. The first inner permeable retainer and the first outer permeable retainer are spaced apart from one another and define a first compartment for holding a first media bed therebetween. The radial flow column further comprises a second cylindrical inner permeable retainer and a second cylindrical outer to permeable retainer surrounding the second inner permeable retainer. The second inner permeable retainer and the second outer permeable retainer are spaced apart from one another and define a second compartment for holding a second media bed therebetween. The fluid chamber has an inlet, an outlet, and a side wall. The first annular compartment is disposed within the fluid chamber, and separated from a wall of the fluid chamber by an outer annular flowspace. The second annular compartment is disposed within the first annular fluid chamber and axially inwardly of the first annular compartment and is separated from the first annular compartment by an intermediate annular flowspace. The radial flow column further comprises an axial lumen.

According to another aspect of the invention, there is provided a radial flow column having at least one axially disposed contained media bed having an axial lumen, and first and second opposed ends, wherein feed water is introduced at both the first and the second ends of the radial flow column.

According to another aspect of the invention, there is provided a method of removing a contaminant from a contaminant stream. The method comprises providing a radial flow column having a fluid chamber, a cylindrical inner permeable retainer, and a cylindrical outer permeable retainer surrounding the inner permeable retainer. The fluid chamber has an inlet, an outlet, and a side wall. The inner and outer permeable retainers are positioned in the fluid chamber. The inner permeable retainer and the outer permeable retainer are spaced apart from one another and define a compartment for holding a media bed therebetween. The method comprises passing the contaminant stream into the space defined radially inward of the inner permeable retainer, passing the contaminant stream radially outward through the media bed to remove at least some contaminant from the contaminant stream and produce a decontaminated stream, and removing the decontaminated stream from the fluid chamber radially outward of the outer permeable retainer.

According to another aspect of the invention there is provided a radial flow column. The radial flow column comprises a fluid chamber, a cylindrical inner permeable retainer at a radius $R_1$ from a central axis of the fluid chamber, and a cylindrical outer permeable retainer at radius $R_2$ from the central axis of the fluid to chamber surrounding the inner permeable retainer. The fluid chamber has an inlet, an outlet, and a side wall. The inner and outer permeable retainers are positioned in the fluid chamber with $R_1$ and $R_2$ being selected according to the following relationship:

$$\Psi \sim \frac{\ln(R_2/R_1)}{2k}\left[1 + \frac{2R_1}{(R_2 - R_1)}\right]$$

where k is a constant, to achieve a defined $\Psi$ or less. The inner and outer permeable retainers define a compartment for holding a media bed packed at a predetermined packing density with a media comprising a sorbent and a filtration aid. The radial flow column further comprises an adjustable element configured to maintain the predetermined packing density within the media bed. Fluid flow through the media bed is directed from $R_1$ to $R_2$.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labelled in every drawing. In the drawings.

DETAILED DESCRIPTION

Figure 1:
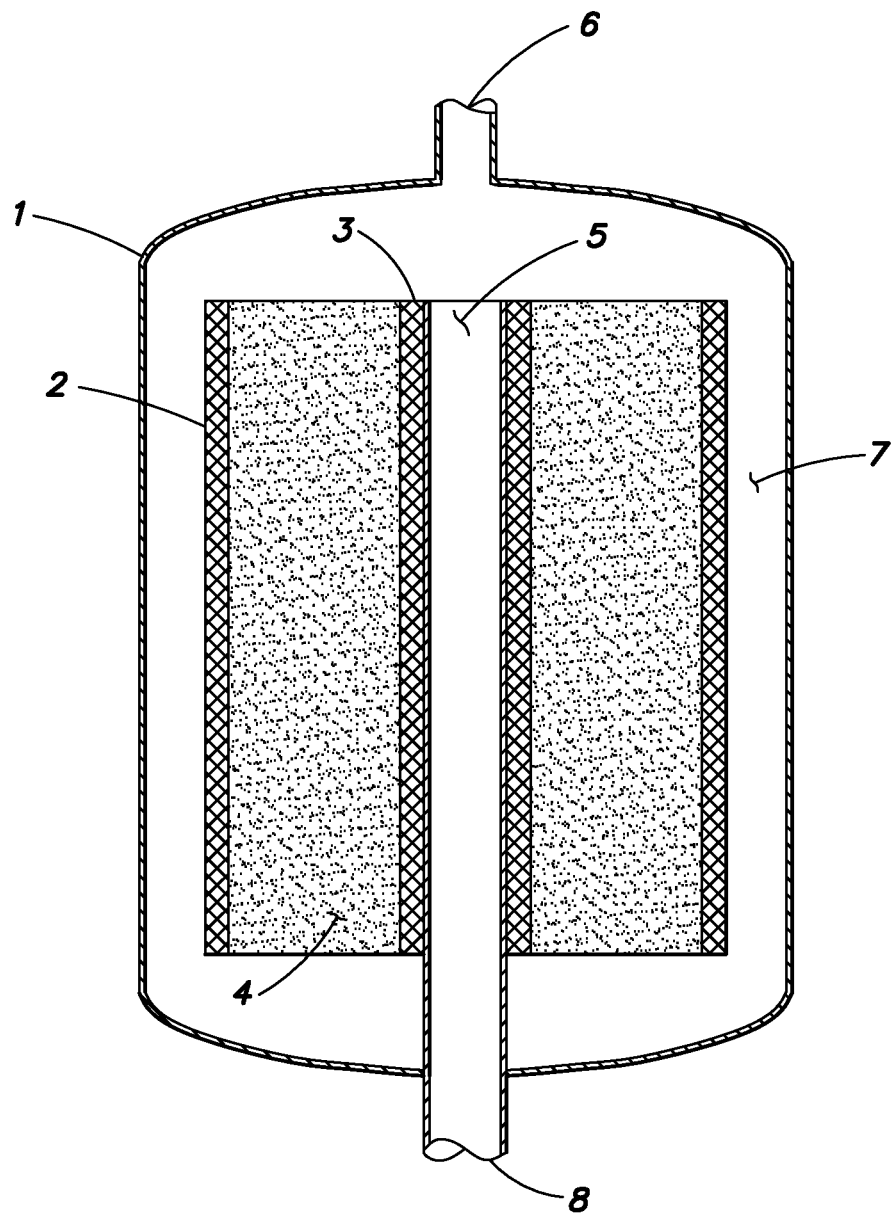
FIG. 1 shows prior art radial flow filtration column.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Radial flow filtration columns (referred to herein as "radial flow columns") are extremely promising for the filtration of contaminants from water. It is, in some implementations, desirable that channels do not form through the media bed in a radial flow column. Channels can allow contaminants to flow with little or no intimate contact with the media directly into the take-off stream. Channels can form through the loss or settling of media. Media can leak out of a screen containing the media after the media is packed, during shipping of a packed media bed, or during use.

Alternatively, a reduction in bed volume can arise due either to gravity, where the particles of media condense at the bottom of a radial flow column, or due to the washing out of smaller particles or media, for example, particles of media having a diameter about equal to or smaller than a mesh size of a screen containing the media bed. Reduction in bed size may take place over a fairly long operational time, for example, over the course of about one year. The loss of media may occur without being noticed. The loss of media may result in the formation of channels in the media bed, which may facilitate the passage of contaminants such as mercury or other hazardous contaminants through the media bed and into the treated stream without proper treatment.

While bed volume can be lost by attrition as described above, it is also possible for the media to expand during use.

If the radial flow column has a fixed head, then the settling of the bed can give rise to fluid flow channels above the top of the bed which, if not blocked, can readily allow the passage of contaminants into the filtered fluid.

Some aspects and embodiments of the present invention prevent or reduce the amount of untreated fluid, for example, water, which channels through a media bed and into the treated fluid stream of a radial flow column due to media loss.

Embodiments of the present invention may be used for various purposes. For example, some embodiments of the present invention may be used for the remediation of industrial wastewater, while other embodiments may be used to remove contaminants from waste water or from ground water to produce potable or drinkable water. Other embodiments may be used in polishing operations for high purity water purification systems, and other embodiments may be used to produce high purity water for laboratory use. Embodiments of the present invention may use various forms of filtration media to accomplish the goals associated with the purpose for which the embodiments are used for. Some examples of media that may be used in different embodiments of the present invention include granular ferric oxide (GFH) media, activated carbon, ion-exchange resin, steel wool (0-valent iron), bio-active media comprising bacterial agents, and any other filtration media or resin. The media may comprise particles with substantially regular shapes (e.g., spheres), irregular shapes, or a mixture of both.

Although embodiments of the invention are illustrated herein with reference to a screen to retain the media bed, it will be appreciated that any sort of permeable retainer can be used to retain the media bed while permitting the flow of fluid in and out of the media bed. In different embodiments, the permeable retainer may be a mesh, a frit, a membrane, a woven or non-woven fabric, a porous ceramic, or other suitable material. For example, in some embodiments, the permeable retainer comprises a polymeric membrane. The polymeric membrane, in some embodiments, has an effective pore size of about 10 µm, and in other embodiments an effective pore size of about 20 µm. In other embodiments, the permeable retainer is a screen, for example, a 5-layer stainless steel screen. In some embodiments the metal screen has a thickness of between about 1 mm and about 3 mm, for example, about 1.7 mm, and a pore size of between about 10 µm and about 30 µm. In other embodiment, the permeable retainer is a plastic screen. In some embodiments the plastic screen has a thickness of between about 3 mm and about 7 mm, for example, about 4 mm, and a pore size of between about 10 µm and about 30 µm.

In various embodiments of the present invention, a device is provided in contact with the media bed to apply a pressure to the media bed and reduce the likelihood of the formation of channels. The device may compact the media bed to counter the reduction in volume that would accompany the loss of media by, for example, escape of small particles of media through a screen retaining the media bed.

Figure 2:
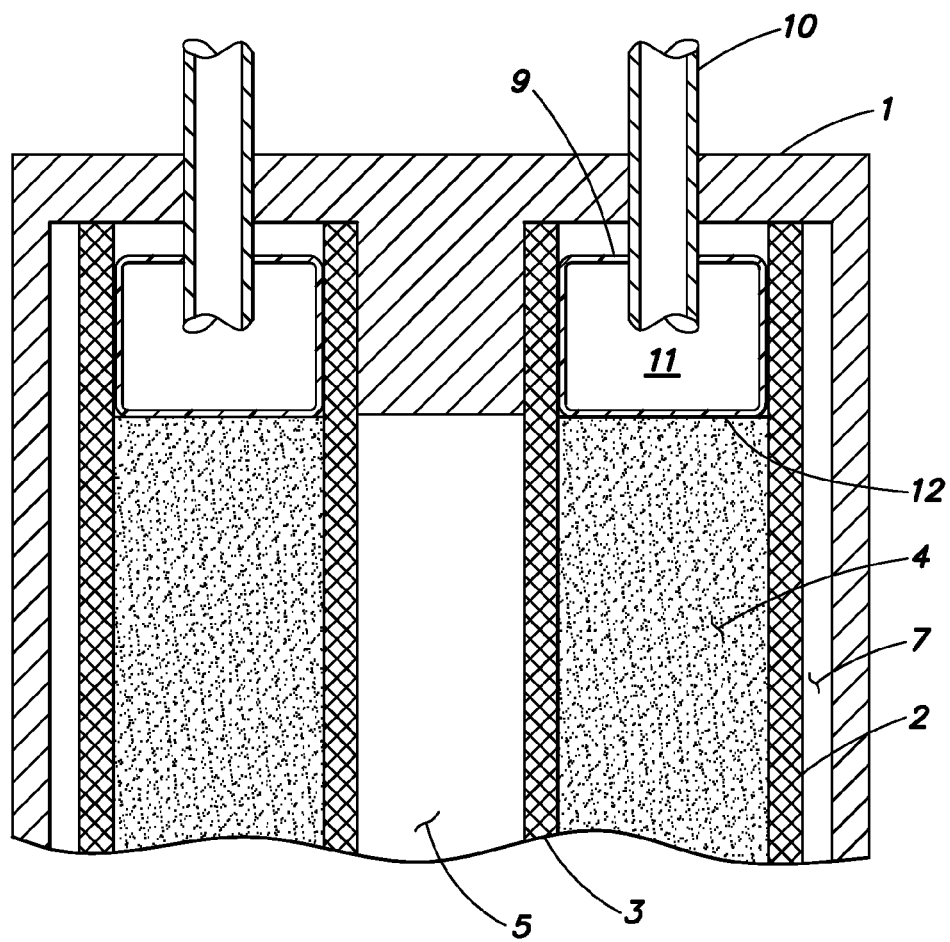
FIG. 2 shows an auto adjusting seal of an embodiment of the present invention for use in radial flow filtration columns.

In one embodiment, as shown in FIG. 2, there is provided an inflatable bladder 9 positioned at the top of a media bed 4 in an annular flow column. When the space between the inner 3 and outer 2 screens is initially filled with media 4, the bladder 9, which in some embodiments is shaped annularly, is positioned on top of or adjacent to the top of the media bed 4. Alternatively, the bladder can be retrofitted to existing columns. The bladder can be inflated, by way of air pressure or by the introduction of a pressurized fluid, for example, water, oil, or pneumatic fluid, through conduit 10 into the cavity 11 of the bladder 9. The inflation of the bladder causes the bladder to press down upon the top 12 of the bed, thereby sealing the space between the inner and outer screens and ensuring that any flow between the inner and outer screens is through the media bed. The bladder will inflate to fill the void at the head of the space between the inner and outer screens above the media. Additional compressed air or fluid can be placed inside the bladder to maintain a desired packing pressure in the media bed and/or such that further expansion of the bladder is possible in response to compaction or loss of media from the media bed. In this way the bladder automatically fills any voids formed as the media compresses. The bladder may be maintained at a pressure which provides for at least partial compaction or at least partial deflation of the bladder should the media in the media bed expand. In some embodiments, multiple bladders 9 may be used in a single column. The multiple bladders may be arranged, for example, annularly about an end of the media bed. The bladder or bladders may be formed from, for example, rubber, plastic, or any other material that would inflate under application of pressure internal to the bladder(s). In some embodiments the bladder or bladders are formed from a metal shaped into an accordion-like structure which expands upon the application of pressure internal to the bladder(s).

In some embodiments, inflatable bladders can accommodate up to about 5% or up to about 10% of media loss by way of expansion, which is a fairly substantial amount of media loss. For example, in some instances, proper sieving of media of less than about 90 µm may take place prior to packing of a media bed where the permeable retainer is a flit or screen with a pore size of about 20 µm. As such, there would be little media sized smaller than the pore size of the frit or screen that could escape therethrough.

In some embodiments, a constant working pressure of between about 1.4 bar and about 2 bar between the influent and the filtrate is used during the radial filtration process. In some embodiments a higher pressure than the working pressure is applied to the inside of the bladder. In some embodiments a pressure of between about 3.5 bar and about 4 bar is applied and pumped into the bladder to push the media down and to keep it compact to prevent channeling. Having an overpressure in the bladder facilitates resistance to deformation of the bladder by the liquid being filtered.

In some embodiments, the bladder is relatively easy to maintain. It can be checked every few months, and by having a pressure gauge on both the influent waste water and the bladder, for example internal to the bladder, a user will be able to determine whether there is a leak in the system or whether it is desirable to pump in any more air or fluid into the bladder. Use of the bladder reduces or eliminates the need to open up the column and refill with media as a result of media loss.

Because the bladder is flexible, it can conform to the shape of the media bed when it is inflated, self adjusting to any irregularities. In some embodiments the bladder or bladders continue to conform to the shape of the media bed and fill up any gaps which are left behind by the loss of the media.

The bladder of the present invention is also useful in showing whether or not the media is correctly packed to the desired density. For example, if it is possible to pump in additional air or fluid below a certain pressure into the bladder immediately after the bed has been packed, this can be an indication of inadequate packing of the bed.

Figure 3:
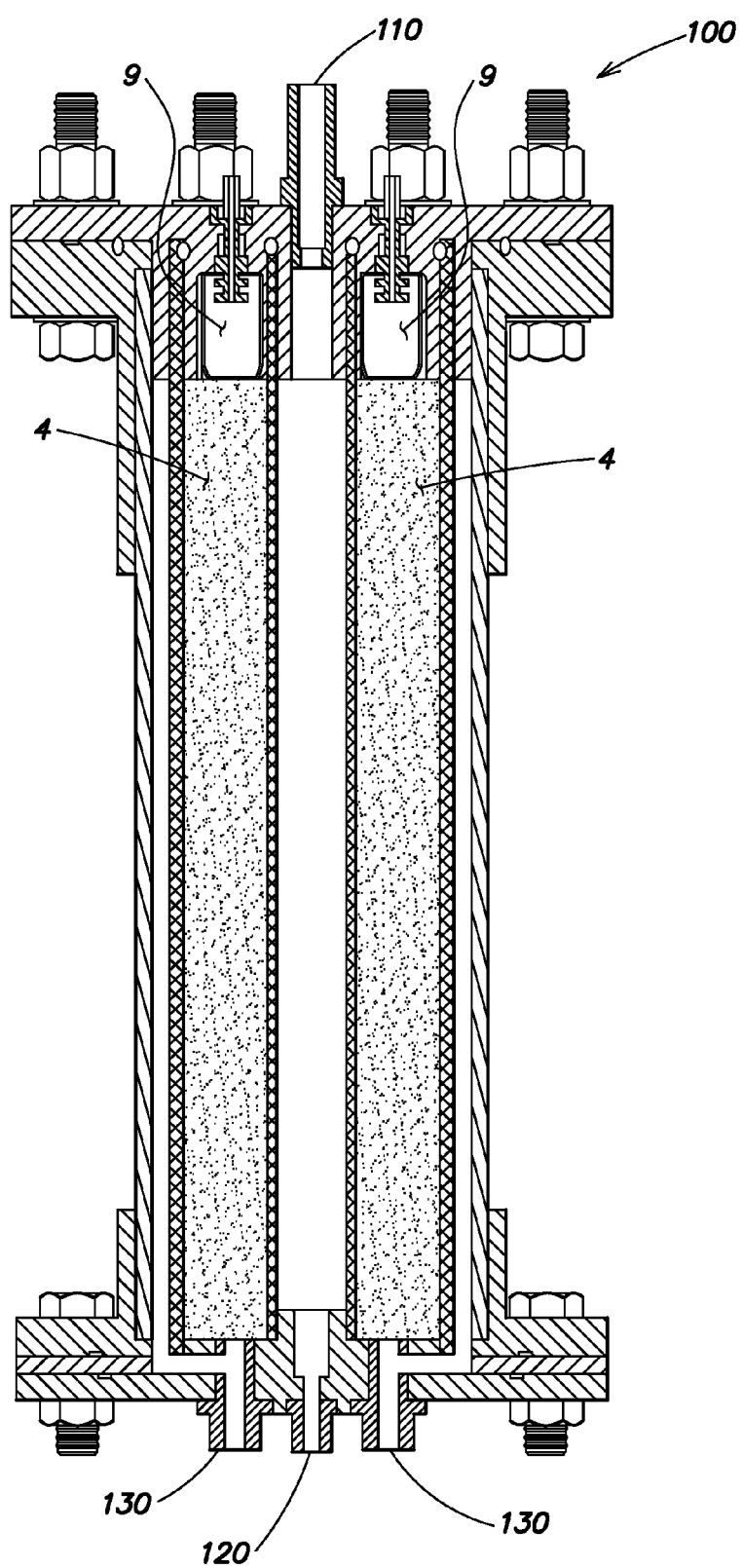
FIG. 3 shows a radial flow filtration column including the auto adjusting seal of FIG. 1.
Figure 4:
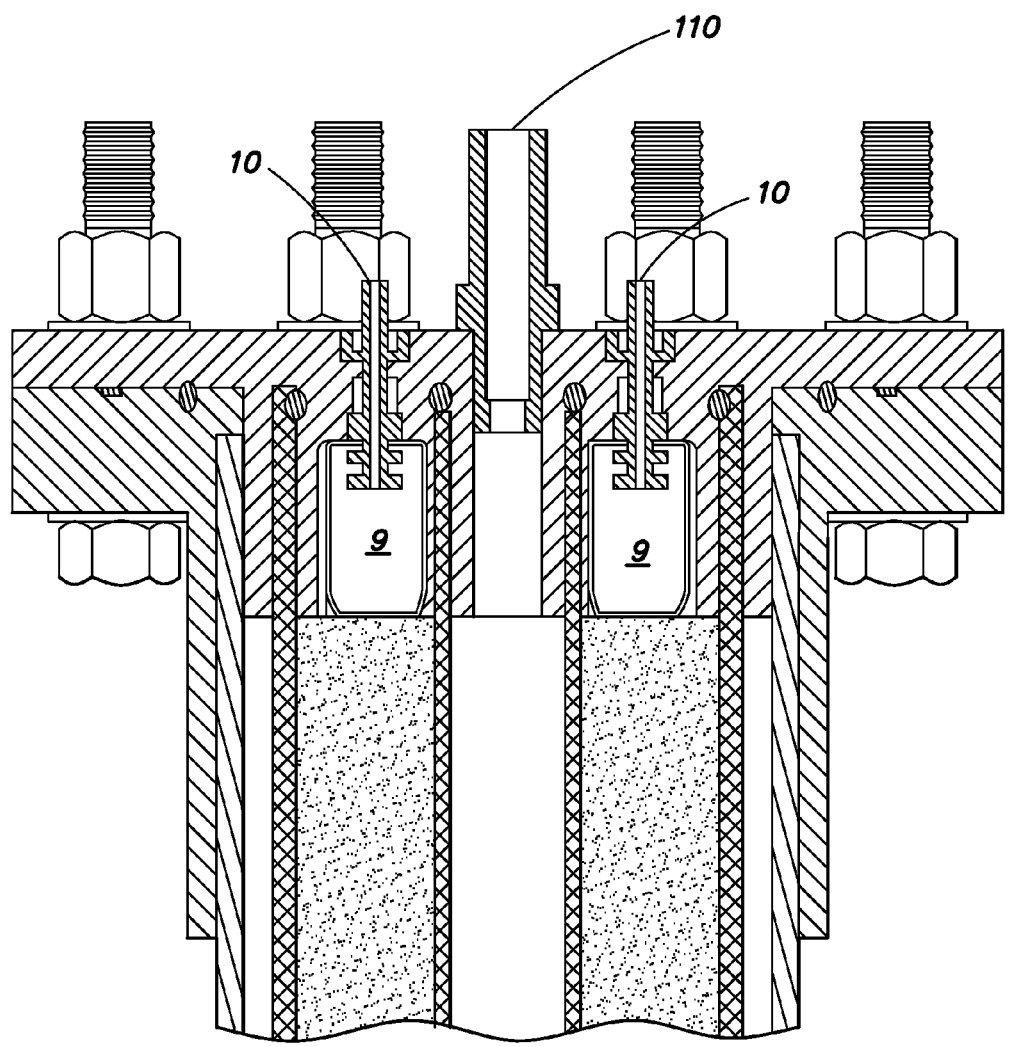
FIG. 4 is a close up of the auto adjusting seal of the radial flow filtration column of FIG. 3.

A radial flow column 100 including a bladder 9 as described above is illustrated in FIG. 3. The radial flow column 100 includes an upper fluid inlet 110, and a lower fluid inlet 120 in fluid communication with a centrally located lumen. The radial flow column also includes two filtered fluid outlets 130. A close-up of the upper end of the radial flow column 100 of FIG. 3 is illustrated in FIG. 4 wherein air conduits 10 for introducing air into the bladder 9 are more clearly visible.

In other embodiments the bladder 9, or one or more additional bladders, may be placed at an alternate location, for example, proximate the center or the bottom of the annular flow column media bed.

In some embodiments, a compressible resilient material may be used in conjunction with, or as an alternative to the bladder 9 to provide a compressive force to the media bed. For example, a portion of a compartment for retaining a filtration media may contain a mass of resilient material, for example, foam rubber. Upon addition of filtration media to the compartment, the resilient material compresses and exerts a force on the filtration media which reduces or eliminates the likelihood of the formation of channels in the media due to, for example, loss of media from the media bed. In other embodiments any system which can provide a controlled compressive force on the media bed may be used to compact or and/or pressurize the media bad to reduce the formation of channels.

Figure 5:
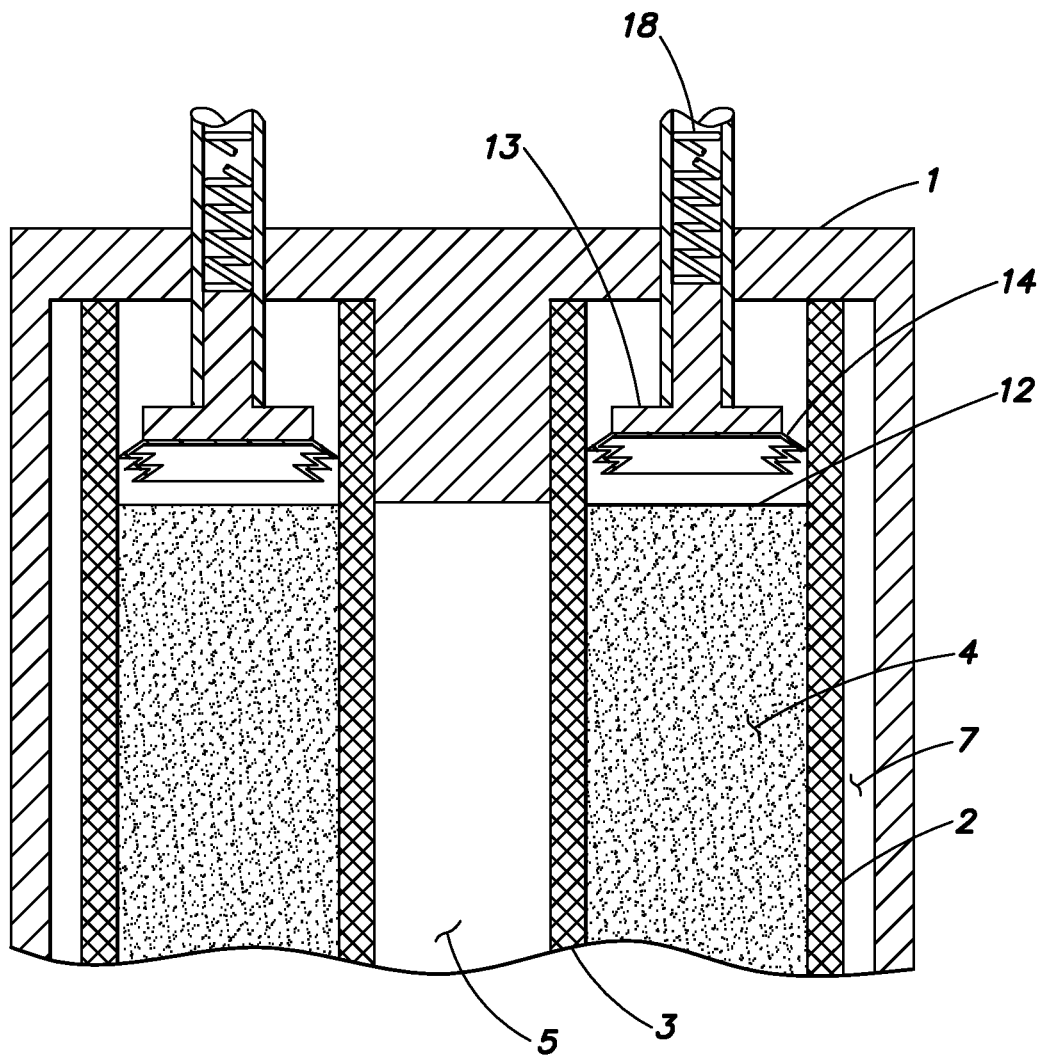
FIG. 5 shows an alternative auto adjusting seal according to another embodiment of the present invention for use in radial flow filtration columns.

For example, in an alternative embodiment, shown in FIG. 5, a series of resiliently biased (for example, spring-loaded) scrubbing elements are utilized to scrub the inner surface of the screen and to pack the media to a desired density. Typically when there is media loss in a radial flow column, the lost media has a tendency to congregate around and clog the O-rings (not shown) which are used to seal the various sections of the device. The alternative space filler of the present invention uses a resiliently biased piston 13 equipped with a scrubber 14 to clean the material from the screen and to compact the surface of the bed. The scrubber comprises a portion which is configured to dislodge media from the walls of the screen. This portion may be shaped in any manner such that it contacts the walls of the screen as the plunger moves into and out from the media bed compartment. Some embodiments of a scrubber in accordance with the present invention employ a series of sequential wipers or scrapers 15, 16, 17, each one having a smaller clearance with respect to the screen than the previous wiper. For example, a lowermost wiper 15 has 1 mm clearance with the screen walls, the next wiper 16 has a 0.5 mm clearance and the uppermost wiper 17 has no clearance, that is the uppermost wiper 17 substantially or exactly conforms to the profile bound by the screens. Embodiments of the present invention are not however, limited to wipers having these, or any particular clearances. Furthermore, in some embodiments more or fewer than three wipers may be present on the scrubber 14. For example, in some embodiments, the scrubber 14 includes only a single wiper, and in other embodiments, the scrubber 14 includes 4 or more wipers.

Figure 6:
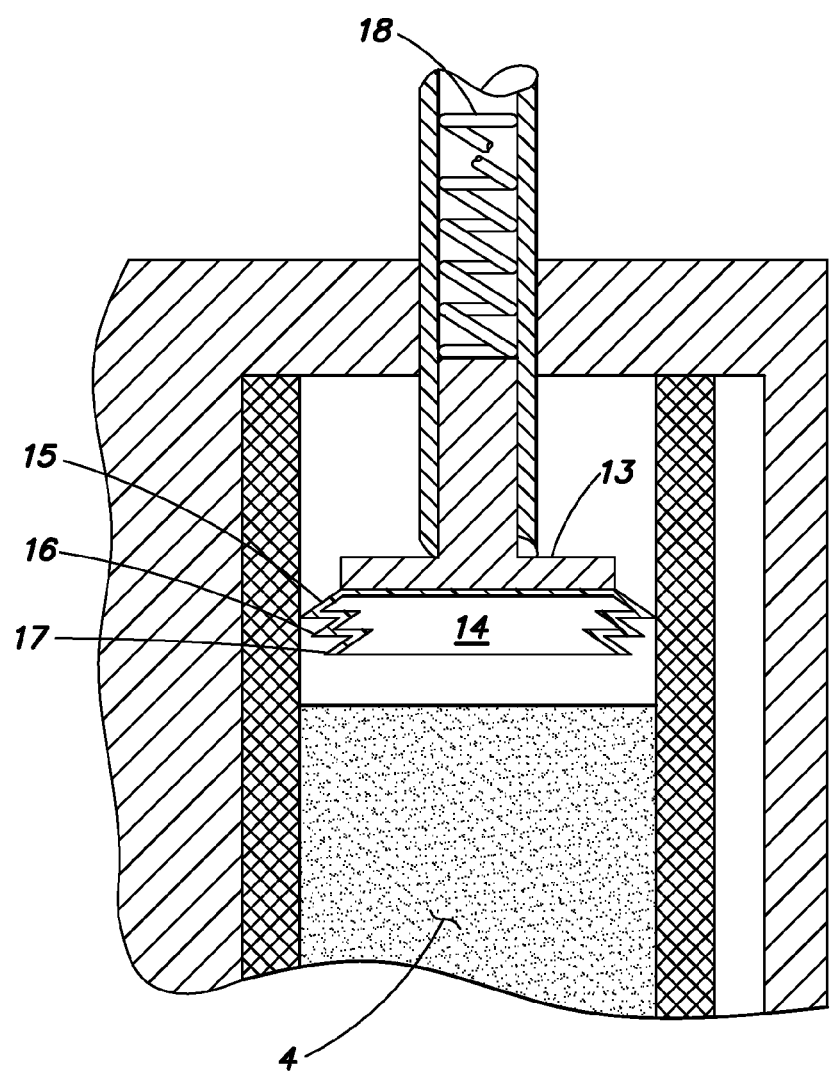
FIG. 6 is a detailed illustration of a portion of the auto adjusting seal of FIG. 5.
Figure 7:
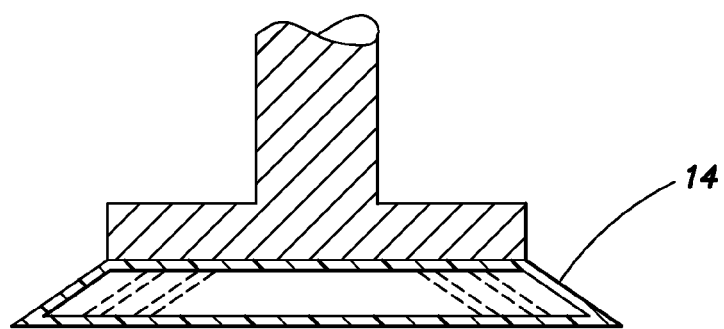
FIG. 7 shows an alternative embodiment of a portion of the auto adjusting seal of FIG. 5.
Figure 8:
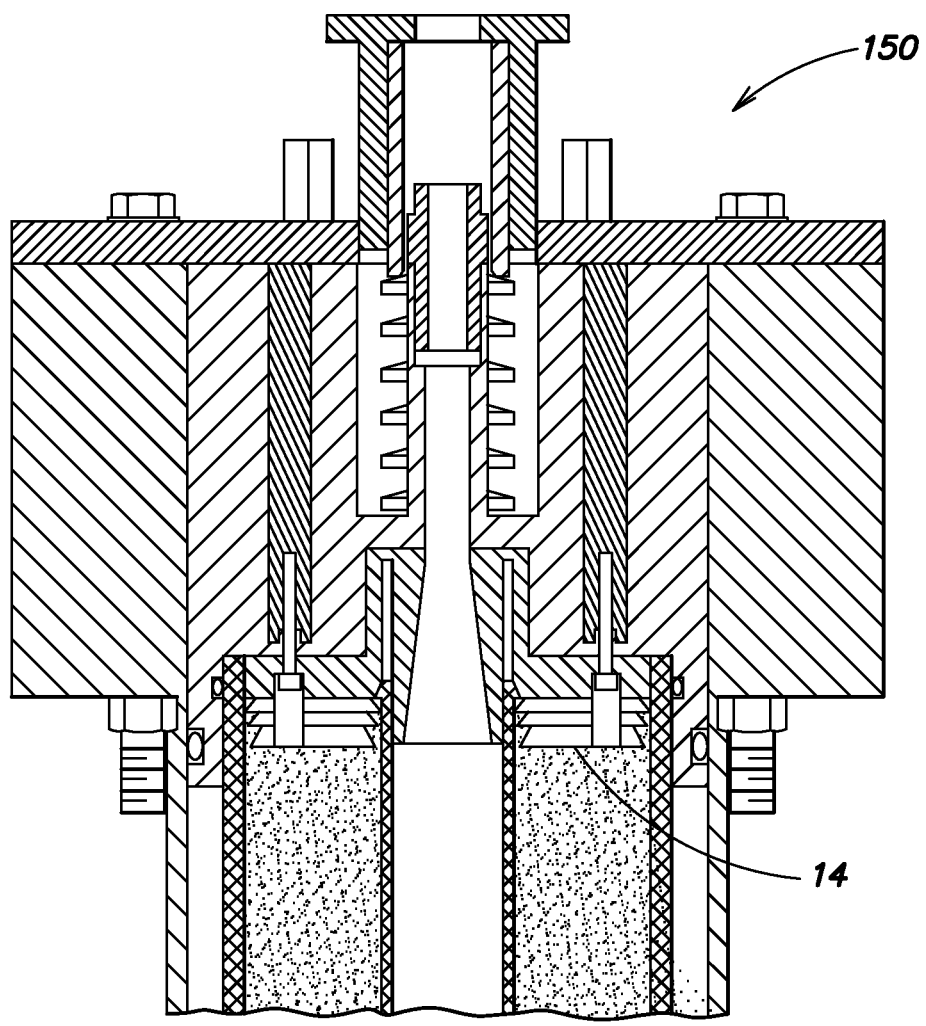
FIG. 8 shows a radial flow filtration column including the auto adjusting seal of FIG. 5.

In some embodiments, the scrubber 14 is downwardly biased by a spring 18. The scrubber may move downward under the action of the spring upon loss of media from the column, or upward upon swelling of the media. As the scrubber 14 moves downward through the area between the screens 2, 3, it dislodges particles, for example, media, adhered to the screen and pushes the particles downward. The scrubber 14 pushes the larger particles down first, then medium sized particles, and finally by the time the third scrubbing element is in contact with the screens, the very smallest particles will be pushed down. FIG. 6 shows this arrangement in more detail. FIG. 7 shows a tightly compressed scrubber, which includes essentially a single scraper element. FIG. 8 illustrates a radial flow column 150 with an annular scrubber 14 disposed above a media bed. In other embodiments, alternative or additional mechanisms may be used to downwardly bias the scrubber 14. For example, the scrubber 14 may be biased downward by a pneumatic piston, by a solenoid, or gravitationally by a weight placed atop a piston on which the scrubber 14 is mounted.

The use of a scrubber 14 as described above has proved very satisfactory for pushing media on the side walls or the screen 2, 3 back to the media bed, providing a constant bed packing density. Since most of the dislodged media in the head space is generally trapped on the side walls of the screens 2, 3, embodiments of the present invention remove those particles and will prolong the life of the O-rings in the device. Further, it will prevent the apertures in the frit or screen from being permanently closed by blockage with the loose media, In another embodiment of the present invention, there is disclosed a method for filling a radial flow column with small media particles. It will be appreciated that any suitable media can be used in the radial flow columns of the present invention.

Columns containing small media particles, for example, media particles having an average diameter in the range of from about 20 μm to about 200 μm are capable of operating with better kinetics than similar columns containing larger media particles due to, for example, the larger surface are of the media particles. Materials with low permeability characteristics can be difficult to handle if they are not carefully packed. The packing pressure of the media is important, and can be selected based upon the media used and the intended use of the column. For example, it may be desirable to use a higher packing pressure for smaller media than for larger media to reduce the potential for the formation of channels in a media bed with smaller media, which may be operated at a higher pressure drop than a similar media bed with larger media. When media with low permeability characteristics is used in radial flow is columns in accordance with embodiments of the present invention, the packing density can be carefully controlled and full packing can be achieved even at about 1 psig to about 2 psig packing pressure. In some embodiments, the radial flow column is packed with media with a packing pressure of between about 1 psig and about 3 psig. Any suitable pressure can be used. For example, the packing pressure may be less than 25 psig, or it may be in excess of 25 psig.

In some embodiments, the packing pressure is achieved by filling the media bed under a pressurized atmosphere at a predetermined desired pressure.

In some embodiments, the media of interest is supplemented with one or more filtering aids. Filtering aid materials may reduce the density of the media bed, providing for increased filtration flow rates with lower pressure drops. The filtering aid material(s) may include materials with a lower density and/or a greater particle size than the media to which they are added. In other embodiments, the filtering aid material(s) may have particle sizes about equal to or smaller than the media to which they are added. The distribution of particle size of a filtering aid material may be greater or less than a distribution of particle size of a media to which it is added. The filtering aid materials may be regularly shaped or irregularly shaped. One particular type of filtering aid is formed from a diatomaceous earth material. For example, a filtration media may be supplemented with a diatomaceous earth material at ratios (by weight) of up to about 1:1 media to diatomaceous earth. In other embodiments, the ratio (by weight) of media to filtering aid may be as high as about 2:1 or higher or as low as about 1:2 or lower. In some embodiments, a very low pressure drop across the radial flow column can be achieved without sacrificing filtration performance or disrupting the flow kinetics through the column. Low pressure drops are advantageous, especially in pumped systems, since it is more energy efficient to operate a filtration column with a lower, rather than a higher pressure drop.

Diatomaceous earths, and in particular, biogenic diatomaceous earths, are used as filtering aid materials in some embodiments due to their relatively low density.

Advanced materials prepared via nanotechnology (for example, nanoparticulate metal oxides such as iron hydroxide, titanium dioxide, or alumina) show promising results in the removal of trace and ultra-trace level inorganic and organic contaminants from a contaminated fluid, such as water. However, these small size materials cannot be packed into standard columns since they would exhibit a high pressure drop with associated channeling. The exact nature of the pressure drop depends upon the type of materials packed into the column. For example, for small media with a high packing density, a higher pressure drop may be needed to obtain a desired filtration flow rate than for larger media with a lower packing density. The shape of the media may also be a factor in determining a pressure drop needed to achieve a desired filtration flow rate. For example, irregularly shaped media may be less easily packed into a high packing density media bed than regularly shaped media. Thus, a media bed containing irregularly shaped media may exhibit a lower pressure drop for a given filtration flow rate than a media bed containing regularly shaped media.

It has been found that blending small media particles (for example, with an average diameter of about 100 µm or less) with filtering aid materials such as diatomaceous earth at ratios (by weight) of, for example, 1:1 media to filtering aid material can provide a low pressure drop without compromising the kinetic performance of the filtration media. This enables the use of a wide range of media with different physical properties (for example, particle size and crystallinity) which can be blended with the diatomaceous earth to provide an overall media bed with a fairly low density, but which still retains the chemical properties of the media.

Figure 9:
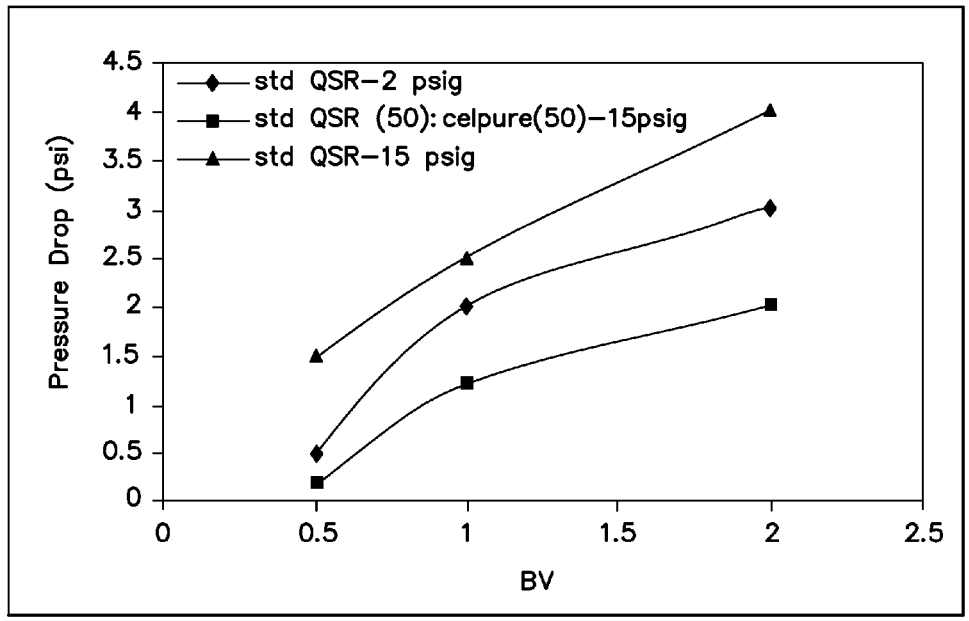
FIG. 9 shows the effect of packing densities and media composition on pressure drop for a given filtration flow rate in an embodiment of a radial flow filtration column of the present invention.

Testing on a lab scale radial flow column in accordance with au embodiment of the present invention has been carried out and the results are illustrated in FIG. 9. In this study, pressure drops corresponding to various filtration flow rates in a filtration column using QSR, a small particle media having a particle diameter of 30 µm±10 µm, was compared with pressure drops corresponding to various filtration flow rates in an identical filtration column using a 1:1 mixture (by weight) of QSR to and Celpure® diatomite filter media, a diatomaceous earth material.

FIG. 9 shows that the 1:1 mixture (by weight) of QSR and Celpure® diatomite filter media at a packing pressure of 15 psig proved to have a significantly lower pressure drop than QSR alone at the same packing pressure for a given filtration flow rate. Even dropping the QSR packing pressure to 2 psig, the 1:1 QSR: Celpure® diatomite filter media mixture in all cases gave a lower pressure drop.

Figure 10:
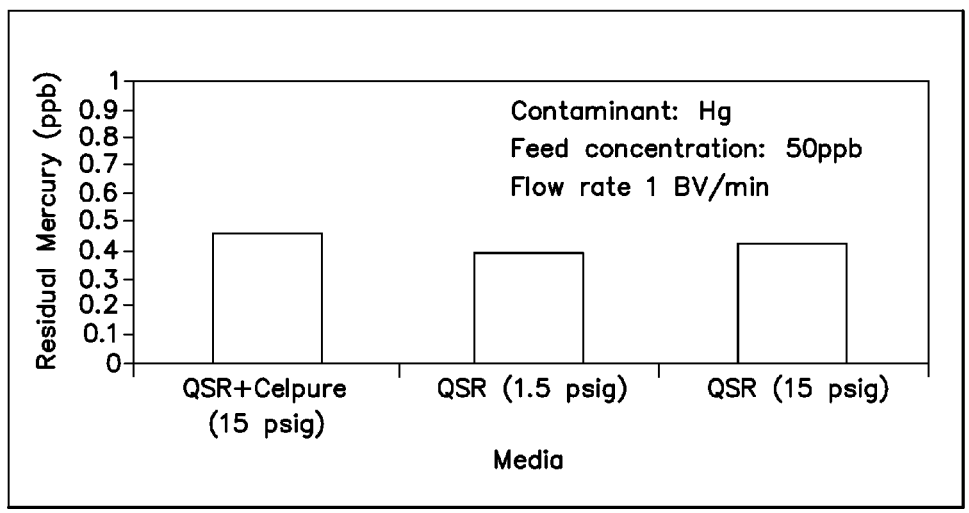
FIG. 10 shows the effect of packing densities and media composition on mercury removal performance in an embodiment of a radial flow filtration column of the present invention.

FIG. 10 shows that while the media blended with the filtering aid showed a reduced pressure drop, its efficacy at removing residual mercury from water was not compromised. QSR with Celpure® diatomite filter media at 15 psig showed rates of mercury removal that were comparable with QSR alone. The rate of mercury removal with QSR alone was fairly pressure independent.

Additional aspects and embodiments of the present invention comprise apparatus and methods of filtering waste water in a radial flow column in which the waste water flows from an inner pipe or lumen to an outer annulus by passing through the packed media. The media forms a porous matrix through which the contaminated water flows while the contaminants are extracted.

Further aspects and embodiments of the present invention include a method of determining dimensions of a radial flow column in which the waste water flows from an inner pipe or lumen to an outer annulus by passing through the packed media which exhibit high filtration performance. Filtration performance is related to the radial velocity of water flowing through the media bed. This flow velocity is dependant on the column dimensions. A rule of thumb rule which has been found useful in identifying criteria which can help improve column performance is that in designing a radial flow column it is desirable to achieve a low value for the dimensionless filtration performance coefficient $\Psi$ (the ratio of average velocity through the media bed to the kinetic rate constant of the media in the media bed), defined as:

$$\Psi \sim \frac{F/2\pi \bar{R} H}{k(R_2 - R_1)} = \frac{F/2\pi RH(R_2 - R_1)/\ln(R_2/R_1)}{k(R_2 - R_1)}$$

$$\Psi \sim \frac{\pi(R_2^2 - R_1^2)\ln(R_2/R_1)H}{k(R_2 - R_1)2\pi(R_2 - R_1)H} = \frac{(R_2 + R_1)\ln(R_2/R_1)}{(R_2 - R_1)2k}$$

$$\Psi \sim \frac{\ln(R_2/R_1)}{2k}\left[1 + \frac{2R_1}{(R_2 - R_1)}\right]$$

Where
F=Total flow rate
k=Kinetic (adsorption) rate constant
$R_1$=Radius of location of inner surface of media bed (cm)
$R_2$=Radius of location of outer surface of media bed (cm)

The above equations suggest that for a constant empty bed contact time (EBCT, the total bed volume divided by the flow rate), the filtration performance is not in any way affected by column height. However, for enhanced filtration performance, $R_2$, the outer radius, divided by $R_1$, the inner radius, should be less than about three.

For example:

For a column with $R_1$ of 10 cm and $R_2$ of 20 cm, the dimensionless performance coefficient $\Psi$ is 1.04/k.

For a column with the same 10 cm bed thickness, but where $R_1$ of 2 cm and $R_2$ of 12 cm, the dimensionless performance constant $\Psi$ is 1.25/k. Thus, it can be seen that the performance of the first column is about 20% greater than the second column, even though the bed thickness is the same.

The above equation suggests a thinner media bed would perform better than a thicker media bed. There are practical considerations regarding how thin a media bed may be desired. For example, as a media bed becomes thinner, the flow rate of waste water to be treated through the media bed would desirably decrease to obtain a desired contact time of the water being treated with the media so that a desired amount of contaminants are removed. To maintain a given filtration flow rate, a column height of the filtration column would increase as the media bed thickness decreased. In some embodiments, a desired balance between column height and media bed thickness may be obtained when the ratio $R_2$/Rt is between about 2 and about 3, corresponding to a $\Psi$ of between about 1.04/k and about 1.1/k.

In existing radial flow columns, the pressure drop across the media bed is generally controlled by the media bed thickness. The thicker the media bed, the higher the pressure drop, and vice versa. When micro- or nano-sized media are used (for example, media with an average particle diameter in a range of from about 30 μm to about 250 μm), this issue becomes even more important, because the overall permeability of such media is inherently low. In practical terms, this means that only a fairly small bed thickness can be used with micro- or nano-sized media. Thus, to get a high specific filtration capacity using a radial flow column with micro- or nano-sized media, a very tall unit may be required It has been discovered that by using one or more additional concentric annular media beds, a more compact form factor can be achieved for a given filtration capacity.

Figure 11:
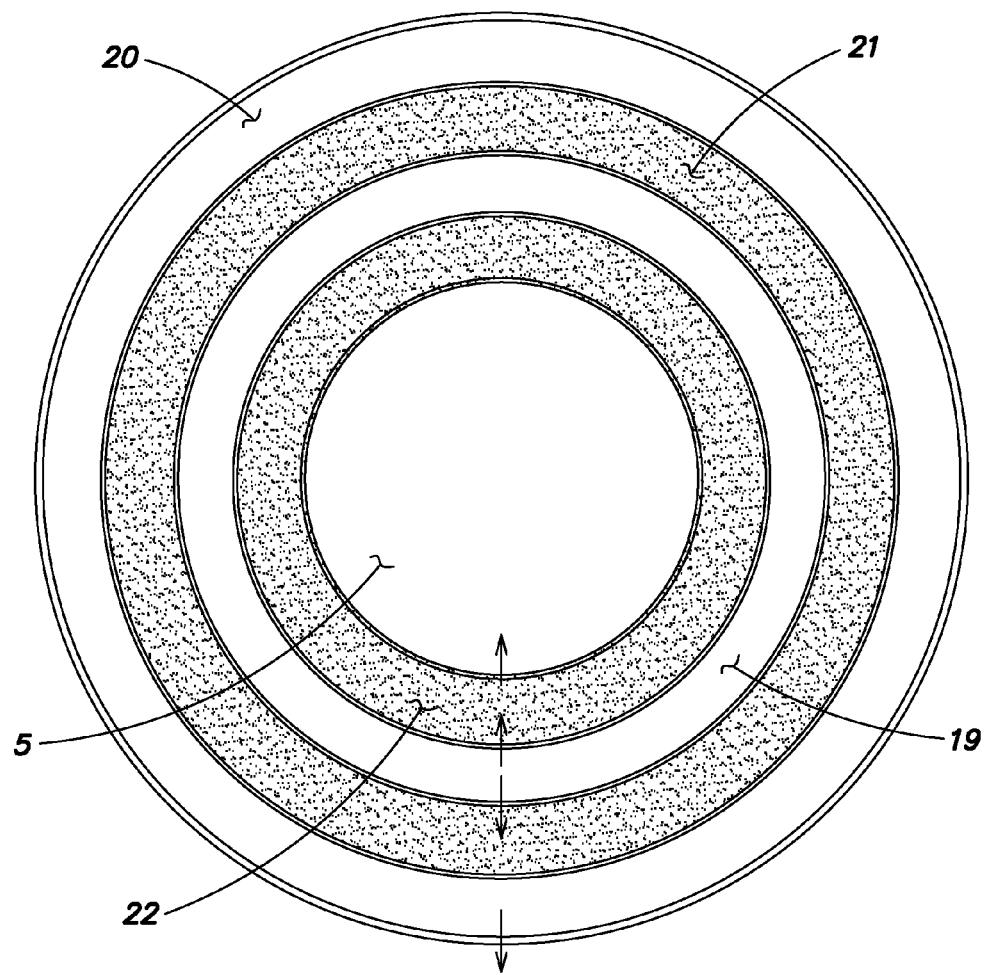
FIG. 11 shows a top-down cross-sectional view of an alternative radial flow filtration column of the present invention.
Figure 12:
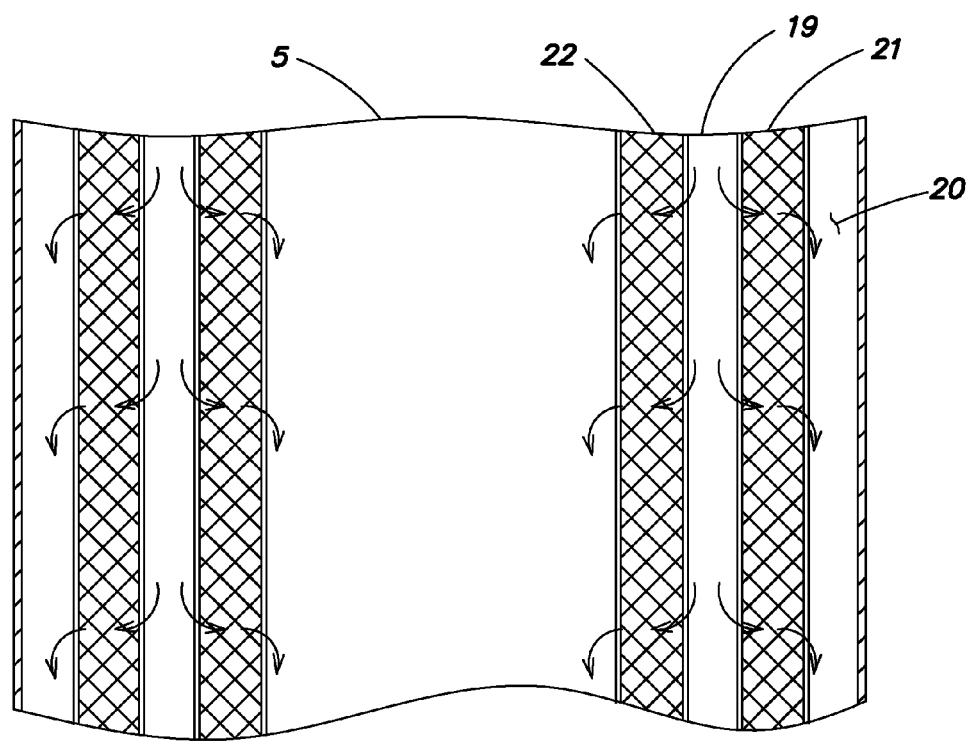
FIG. 12 shows a cross-sectional view from the side of the radial flow filtration column of FIG. 11.

FIG. 11 and FIG. 12 show a device in which three fluid passageways are available for water flow, namely a lumen 5, a mid annular channel 19, and an outer annular channel 20. The device includes two concentric media beds, contained by screens or frits. An inner media bed 22 is located between the lumen 5 and the mid annular channel 19. An outer media 21 bed is located between the mid annular channel 19 and the outer annular channel 20. Inlet water enters the device and passes initially into the mid annular channel 19. The water then splits and passes into both the inner media bed 22 and outer media bed 21. The treated water then passes into the outer channel 20 and the lumen 5. In some embodiments, the thicknesses of the inner media bed 22 and outer media bed 21 are balanced such that in operation water passing through the inner media bed 22 is treated substantially equally to water passing through the outer media bed 22. For example, the thicknesses of the inner media bed 22 and the outer media bed 21 may be determined to provide for fluid flow rates through each of the inner and outer media beds that would yield equivalent contact time of the water flowing through each with the media contained therein. Additionally or alternatively, a packing density or a filtration aid to media ratio in the media beds 21, 22, may be selected to yield equivalent contact time of the water flowing through each with the media contained therein.

Each media bed 21, 22 exhibits its own pressure drop. Such a configuration can provide a similar filtration capacity in a shorter unit that would be provided in a taller unit having a single media bed. For example, a computational fluid dynamics (CFD) analysis shows that an annular media bed with a thickness of 200 mm and a height of 380 mm operated at a wastewater treatment rate of 80 liters per minute (1 bed volume per minute) exhibits a pressure drop of 147 psi for a given micro media. Decreasing the bed thickness to 100 mm, while maintaining the same wastewater treatment rate would give a concomitant decrease in pressure to 34 psi, but the height would need to increase nearly threefold, from 380 mm to 1100 mm, to achieve the same bed volume and therefore the same filtration capacity.

Using a split flow configuration, with for example, two concentric 100 mm thick beds, the height of the flow column can be maintained low, for example, 460 mm, while a pressure drop of 26 psi may be applied to achieve the same wastewater treatment rate as above.

Figure 13:
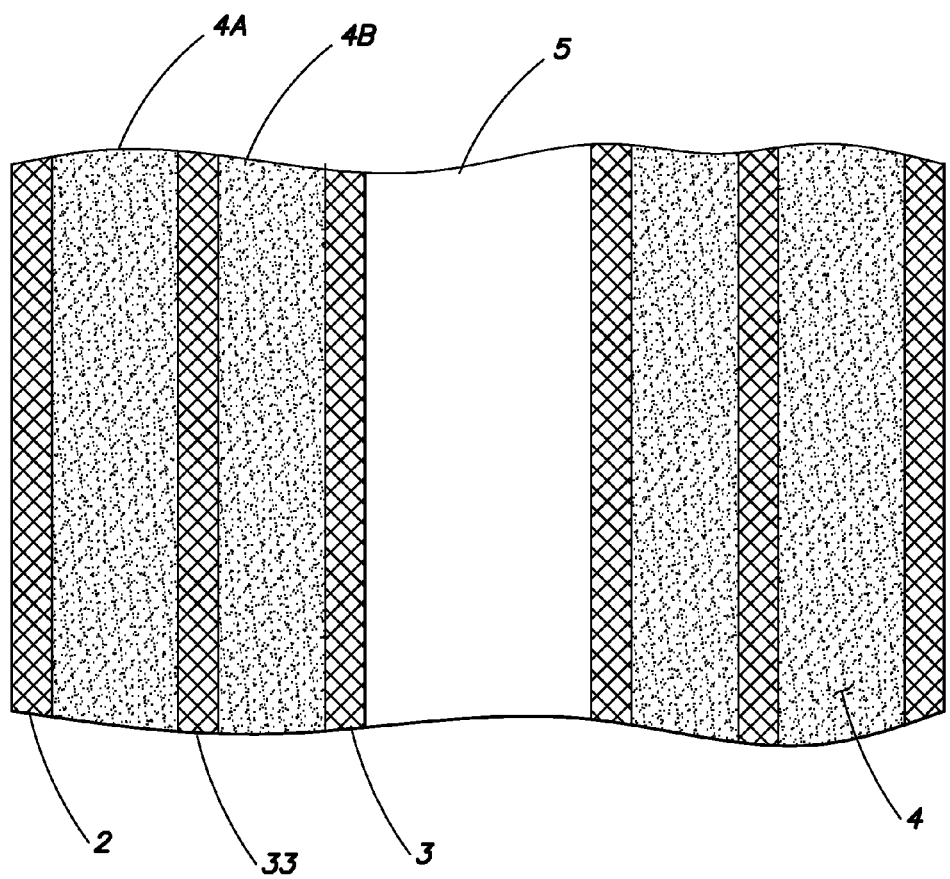
FIG. 13 illustrates a cross section of a media bed in accordance with an embodiment of the present invention.

In another embodiment, a media bed for use in a radial flow column may include multiple layers, each with a different form of media contained therein. Such layered media beds provide for the use of different types of media, for example, sorbent media designed for the removal of different types of metals, in the same media bed. An example of an axially layered media bed is illustrated in FIG. 13, a cross section of an annular media bed which may be used with any of the embodiments of radial flow columns described herein. The axially layered media bed of FIG. 13 includes, in addition to the inner media screen 3 and the outer media screen 2, an intermediate media screen 33 in the media bed 4, which is substantially parallel to the screens 2 and 3. The intermediate media screen 33 divides the media bed 4 into two section, section 4A and section 4B.

The two sections 4A and 4B may be filled with different types of media. For example, one of sections 4A, 4B may be filled with activated charcoal while the other of sections 4A, 4B is filled with an ion-exchange resin. In another embodiment, one of the sections 4A, 4B may be filled with a media specially adapted for removal of a first contaminant, for example, mercury from contaminated water, while the other of the sections 4A, 4B is filled with a media specially adapted for removal of a second contaminant, for example, copper from contaminated water. This embodiment would prove beneficial in situations where there are two media with excellent performance with regard to specific contaminants and the water to be treated includes both of the contaminants.

In a further embodiment, media in both of sections 4A and 4B may be used for removing the same contaminant, for example mercury, from a fluid stream, for example, mercury contaminated water. The first media that the fluid being treated passes through (for example, media in the bed section 4B when the radial flow column is operated in inside-out filtration mode) can be a relatively inexpensive media used to bring the contaminant concentration down from, for example, a parts-per-million (ppm) level to a parts-per-billion (ppb) level. The second media that the fluid being treated passes through (for example, media in the bed section 4A when the radial flow column is operated in inside-out filtration mode) can be more expensive media specially adapted to reduce the contaminant level of the fluid being treated from, for example, a ppb level to a parts-per-trillion (ppt) level. This combination would reduce the amount of the more expensive media used, and thus the overall cost of the media in the media bed.

The two sections 4A, 4B in some embodiments have substantially equal or equal volumes, and in other embodiments have different volumes. The volumes of the sections 4A, 4B may be selected depending on the types of media to be used and the types of contaminants and desired level of contaminant removal desired. For example, if a radial flow column using a layered media bed such as illustrated in FIG. 13 were to be used for the removal of both mercury and arsenic from wastewater using mercury removal resin and arsenic removal resin, and the wastewater contained more mercury than arsenic, or if the mercury removing resin utilized operated with slower kinetics than the arsenic removal resin, it could be desirable to size the section to of the bed holding the mercury removing resin greater than the section of the bed holding the arsenic removal resin. In addition, the pore or mesh sizes of each screens 2, 3, and 33 need not be equal, but could be selected based on the particle size of media to be enclosed in the compartments defined by these screens.

In different embodiments, a media bed could be divided into more than two layers. For example additional intermediate screens could be added to the media bed of FIG. 13 to provide a layered media bed with 3, 4, or more layered sections.

In some embodiments, the different layers of media may be provided without an intermediate media screen dividing them. The different layers of media may have an abrupt interface between them or, in other embodiments, may have an interface between media layers that exhibits intermixing. In some embodiments, a composition of a media bed may vary smoothly from one side of the bed to the other with one side of the media bed having media primarily of a first composition, and another side of the media bed having media primarily of a different composition. In further embodiments, multiple types of media may be mixed together at a substantially constant mixing ratio throughout the media bed.

Media beds in accordance with some embodiments may additionally or alternatively be layered horizontally, with the composition of the media bed varying along a length of the flow column. The horizontal layers may exhibit abrupt interfaces from one layer to another, or interfaces with mixing of media types, and may or may not include media screens dividing the horizontal layers. In some embodiments, a thickness of the media bed may be adjusted to account for the different permeabilities of the different media in the different layers. For example, if a first layer of media had a significantly lower permeability than a second, water to be treated might preferentially flow through the second layer of media rather than the first. To induce an equal, or approximately equal amount of water to pass through both the first and second layers, the layer with the greater permeability could be provided with a greater thickness than the layer with the lower permeability. The bed thickness along a radial flow column may also be varied to account for pressure differentials due to, for example, gravity, to accomplish substantially equal flow through the media bed along the length of the column.

Further, a pressure exerting element, such as the bladder 9, or the scrubber 14 described above could be provided for each section of a layered media bed. Each section of the media bed could individually be pressurized to a packing pressure or packing density appropriate to the type of media in the section.

A further benefit arising from the use of radial flow columns with media beds maintained at a constant packing density is that they can be used in any orientation. Conventional axial flow filtration columns must be operated in a vertical configuration, however, the columns of the present invention can be operated vertically, (i.e., with the lumens vertical), horizontally, or at any angle in between without any anomalous effects on the flow distribution. In some embodiments, when operated non-vertically, a radial flow column may be provided with a bladder 9 or piston 13 and scrubber 14 at one or both ends of the media bed of the radial flow column.

The use of pressure to move the fluid through the media bed means that the effect of gravity on the flow pattern is negligible. The present inventors have modeled the pressure distribution and found that even in a vertical flow column, the axial pressure distribution, away from the lumens, is equal in all directions.

The use of pressure to move the fluid through the media bed also provides for radial flow columns with greater versatility to be scaled-up for commercial use. For example, one approach to scale up capacity is to provide a number of filtration columns in parallel. The orientation of the filtration columns plays a role in the assembly configuration. The versatility of the radial flow columns of embodiments of the present invention to be arranged in a horizontal orientation enables a horizontal stacked configuration rather than several vertical cylinder type configurations which would require a larger footprint.

Figure 14:
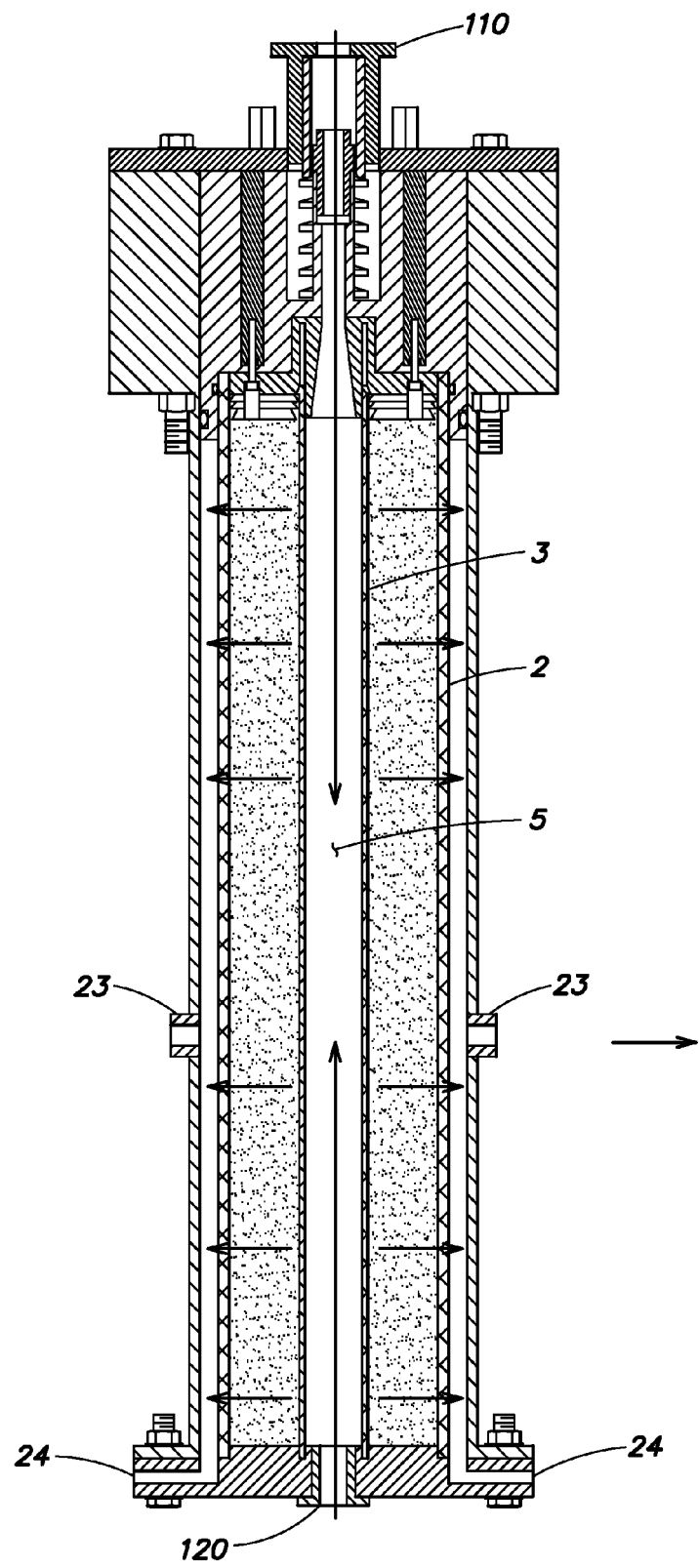
FIG. 14 shows a further alternative radial flow filtration column of the present invention.

Another embodiment of the invention is shown in FIG. 14. Where use of a relatively tall column is unavoidable, there is the possibility that a problematic pressure gradient can arise in the inlet channel of the lumen. This pressure gradient could result in different flow velocities of liquid being treated through different portions of the media bed, which could result in uneven usage of the media, and exhaustion of media in one section of the media bed before exhaustion of media in another portion of the media bed. This problem can be addressed by splitting the inlet flow into two, from the top and the bottom of the column. This flow is also beneficial when it is desired to increase column capacity while maintaining a constant bed thickness along the length of the column. It is generally desired that flow rates into both the top 110 and the bottom 120 inlets are equal, or at least substantially equal, to avoid short-circuiting, leading, for example, to the situation where one of the flows has less residence time in the column than the other, giving quality variation of the treated water. As shown in FIG. 14, the flow column has an upper inlet 110 and a lower inlet 120, both inlets in fluid communication with the lumen 5 of the flow column. One or more filtrate outlet channels 23 are located in the middle of the column. One or more additional filtrate outlets 24 may be located at another position, for example, proximate the bottom of the column.

Figure 15:
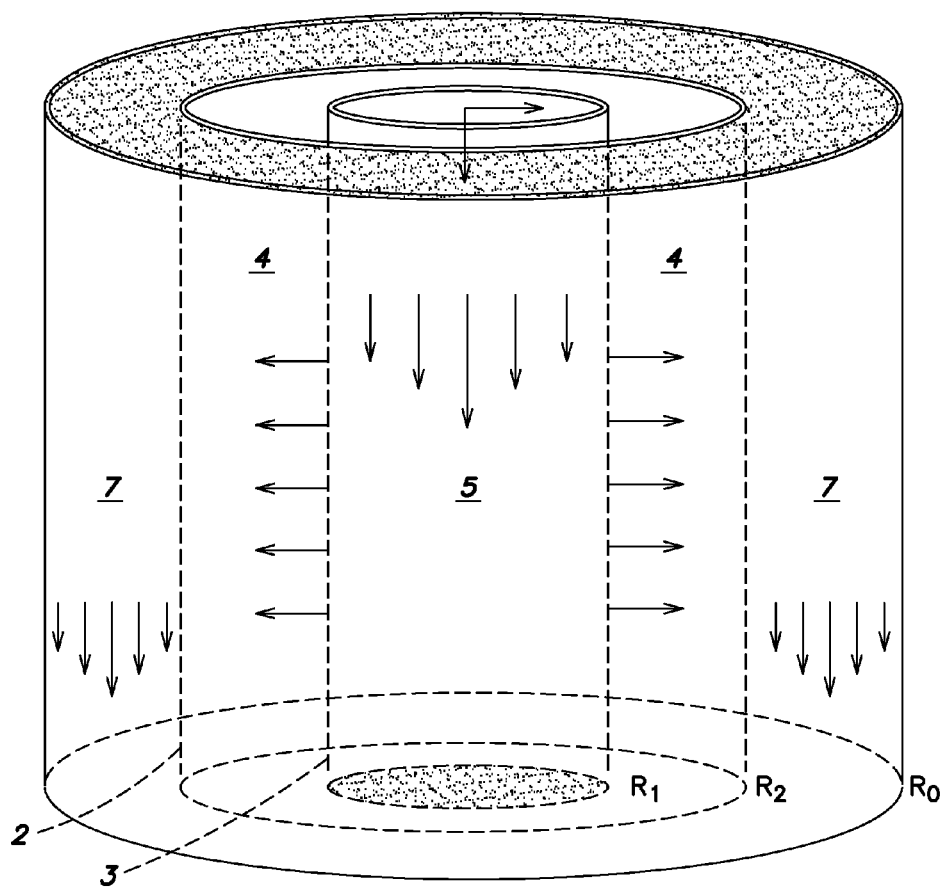
FIG. 15 shows a schematic of a radial flow filtration column of an embodiment of the present invention with a centrifugal (CF) or inside-out (I-O) flow configuration.

Yet a further embodiment of the invention is disclosed with reference to FIG. 15. Conventional commercially available radial flow columns first run the contaminant fluid (for example, water contaminated with heavy metal) into the outer annulus 7, that is, the space between the outer screen and the wall of the fluid chamber. The contaminant stream is then passed radially inwardly through the media bed 4, where the contaminants are removed. The treated fluid is then drawn off via the central lumen 5. This is referred to as centripetal (CP) or outside-in (O-I) flow.

It has been discovered that superior performance can be obtained by passing the fluid through the column in a manner counter to the usual direction, that is, in some aspects and embodiments of the present invention the contaminant stream may be initially fed into the lumen space 5 defined by the inner screen 3 then passed radially outwardly through the media bed 4. The decontaminated stream then exits into the outer annulus 7, from where it is drawn off, as indicated in FIG. 15. The flow method of this particular aspect of the present invention can be referred to as inside-out (I-O) or centrifugal (CF) flow.

Conventional O-I flow can result in uneven extraction of contaminants, where high extraction rates primarily occur near the outer annular perimeter of the media bed 4, and lower levels of extraction take place nearer the lumen 5. Because the media bed 4 is largely immobile, high levels of contaminants are taken up (for example, by adsorption) at the outer annular perimeter, while much smaller amount of contaminants are taken up in the media bed proximate the inner annular perimeter. This results in a maldistribution of bed utilization. However, the I-O flow of embodiments of the present invention allows for more uniform utilization of the filtration media, minimizing maldistribution of media bed utilization, and allowing apparatus performance to be maintained for a longer period. Also, because the filtration media is used evenly, when the time comes to replace the media, there is no need to attempt to recover that portion of the filtration media with residual capacity. This can enhance the ease of operation and maintenance of the apparatus while minimizing the recurring operational cost.

The advantages of an I-O flow configuration for a radial flow filtration column over an O-I flow configuration for a radial flow filtration column can be explained as follows:

Regardless of which direction the fluid flows, it moves at different velocities ($V_r$) at different points in the media bed due to the differences in the available surface area of the media and the reduced cross sectional area of the media bed closer to the lumen. Relatively higher radial fluid flow velocities ($V_r$) are exhibited in the inner region (near the lumen 5) whereas relatively low $V_r$s are exhibited in the outer annular regions.

In O-I flows, the contaminant concentration [$M^+$] is higher in the outer region than in the inner region, providing better kinetics for absorption of the contaminant onto the filtration media in the outer region as compared to in the inner region. In contrast, in I-O flows, the opposite occurs, with better kinetics taking place in the inner region. This difference gives rise to a significant difference in the overall performance of contaminant extraction. A higher extraction rate is achieved when [$M^+$] is higher (high kinetics rate), or $V_r$ is lower (where there is a longer contact time between contaminant and media), or both. For example, a higher contaminant extraction rate would be observed at points in a flow column where the ratio [$M^+$]/$V_r$ is higher than at points in a flow column where the ratio [$M^+$]/$V_r$ is lower.

In O-I flows, the initial conditions at the outer perimeter of the annulus are that [M+] is high and $V_r$ is low, resulting a higher contaminant extraction rate relative to the central region, where [M+] is lower, and $V_r$ is higher.

In I-O flows, the initial conditions at the inner perimeter of the annulus are that [M+] is high and $V_r$ is high, resulting in a moderate contaminant extraction rate. In the outer region, [M+] is low, and $V_r$ is low, also resulting in a moderate contaminant extraction rate. In filtration columns operated using I-O flows, the parameters of [M+] and $V_r$ are better balanced across the width of the media bed than in similar filtration columns operated using O-I flow.

Figure 16:
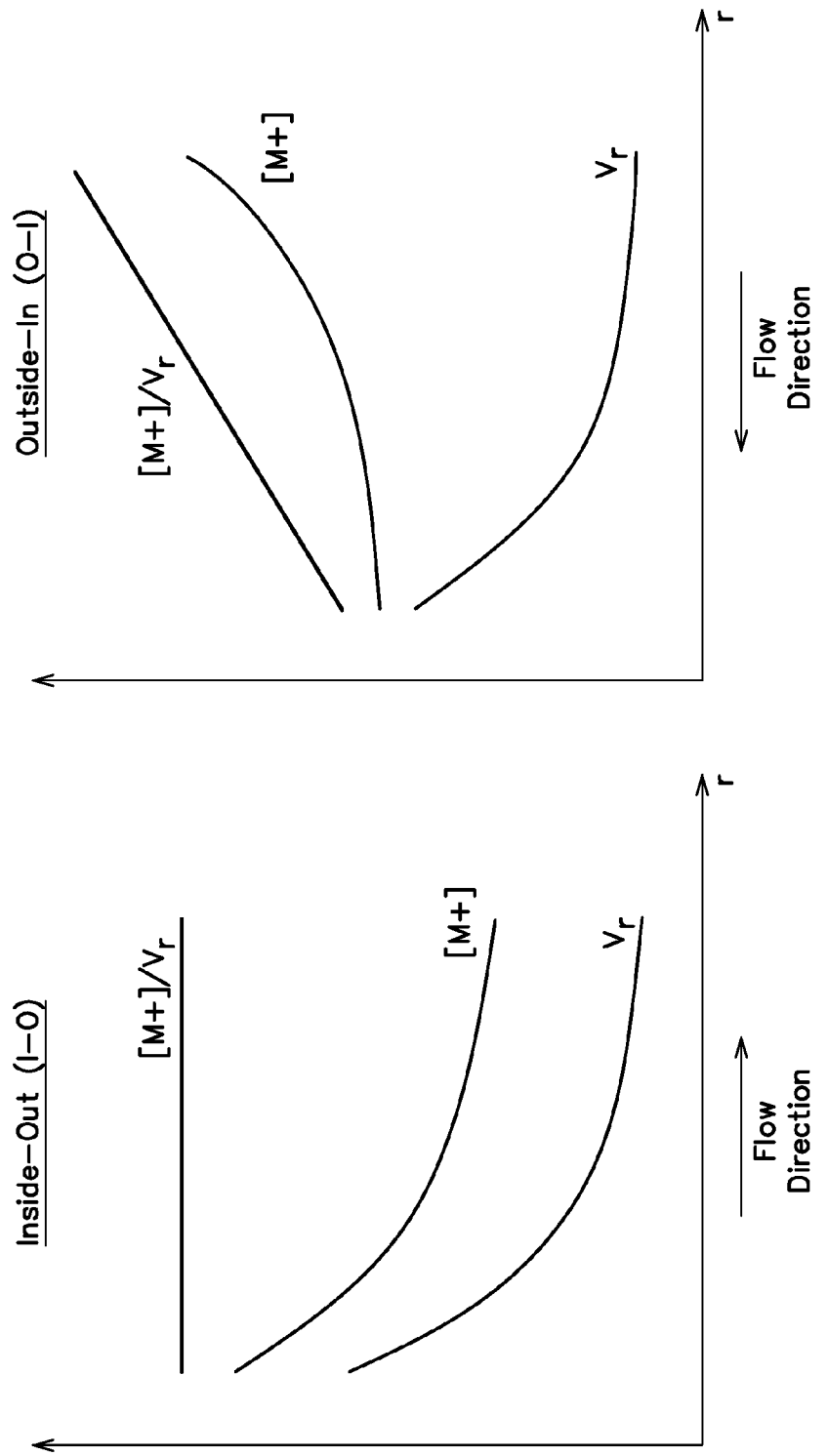
FIG. 16 are comparative charts showing media bed utilization in an inside-out (I-O) flow type radial flow filtration column and an outside-in (O-I) flow type radial flow filtration column.

FIG. 16 shows the maldistribution of [M+] and $V_r$ for O-I flow type radial flow filtration columns, which can lead to non-uniform media bed utilization. FIG. 16 also illustrates that in I-O flow type radial flow filtration columns, in accordance with embodiments of the present invention, the media bed is utilized much more uniformly than in O-I flow type filtration columns. Notably, in the I-O flow type filtration columns, the [$M^+$]/$V_r$ ratio may be substantially uniform throughout the media bed, suggesting that when the filtration media is exhausted, it will be uniformly so and can be replaced all at one time. In O-I flow type filtration columns, after operation for a given period of time some of the filtration media (for example, media proximate the outer periphery of the media bed) may be well past exhaustion, while other filtration media (for example, the media proximate the outer periphery of the media bed) remains in good condition. Thus, the options are to continue to run the column with much of the filtration media ineffectual, to discard the filtration media even though a large portion remains potentially useful, or to separate the filtration media. These options are less desirable and more costly than using the media more efficiently in the first instance, as may be accomplished with embodiments of the present invention utilizing I-O flow type filtration columns.

In one embodiment, the media bed is packed at a predetermined packing density of from about 1 psig to about 3 psig with a filtration media comprising a sorbent and a filtration aid. The inner and outer dimensions of the column are selected so as to achieve a desirably low value of the dimensionless value Ψ as described above. An adjustable element maintains the predetermined packing density within the media bed. The fluid flow in the apparatus is from the inner lumen of the bed to the outer wall, i.e. fluid flow is from across the media bed is from $R_1$ to $R_2$.

Figure 17A:
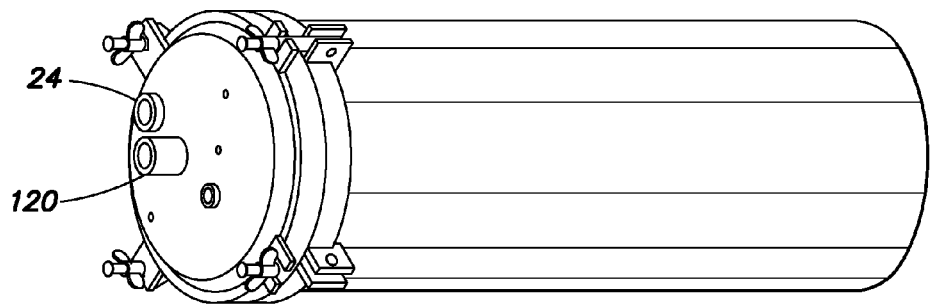
FIG. 17A is a perspective view of a radial flow filtration column in accordance with an embodiment of the present invention.
Figure 17B:
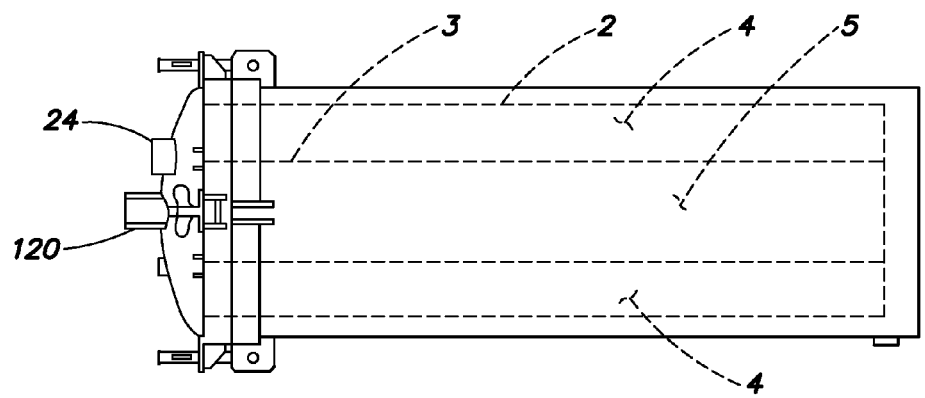
FIG. 17B is a side view of the radial flow filtration column of FIG. 17A.
Figure 17C:
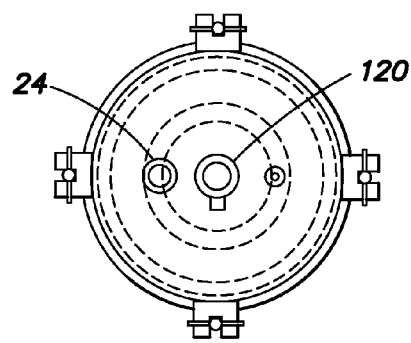
FIG. 17C is an end view of the radial flow filtration column of FIG. 17A.
Figure 18A:
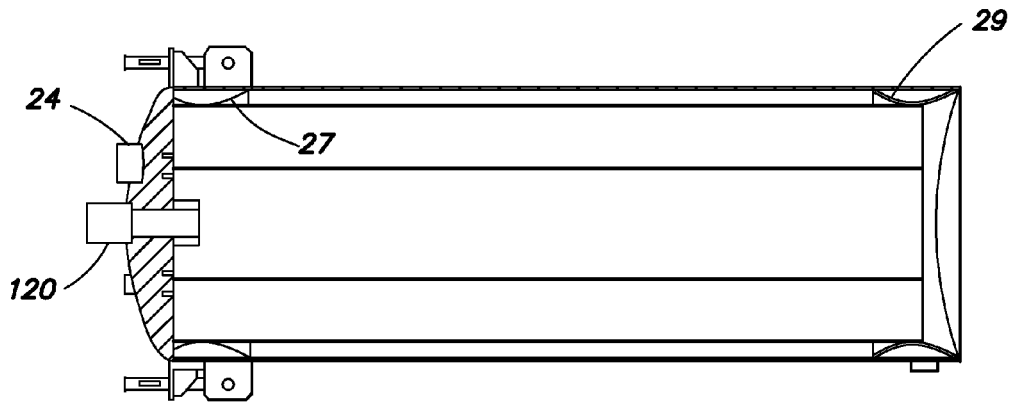
FIG. 18A is a cross-sectional view of the radial flow filtration column of FIG. 17A.
Figure 18B:
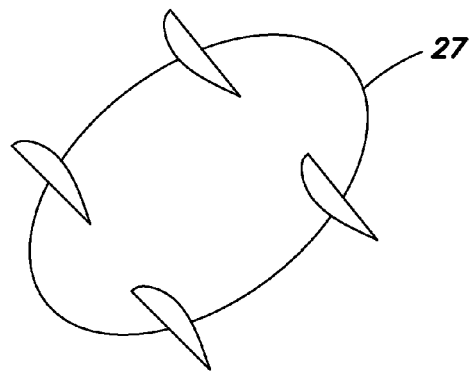
FIG. 18B is a perspective view of a first media bed retainer.
Figure 18C:
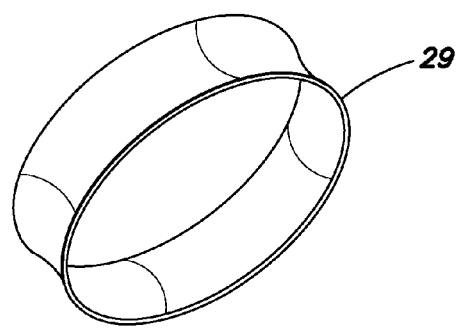
FIG. 18C is a perspective view of a second media bed retainer.
Figure 19A:
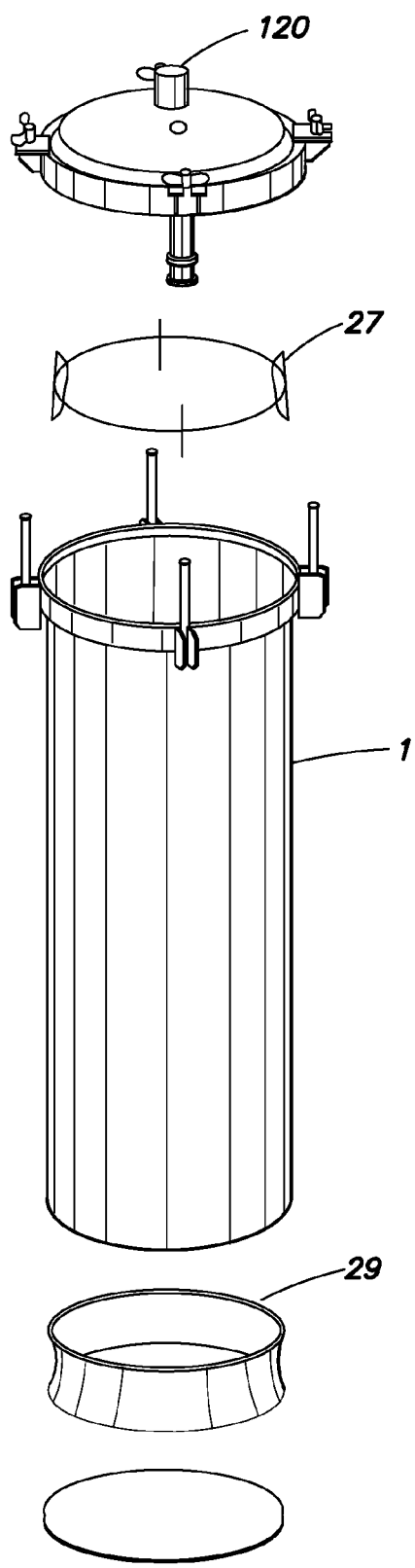
FIG. 19A is a partially exploded view of the radial flow filtration column of FIG. 17A.
Figure 19B:
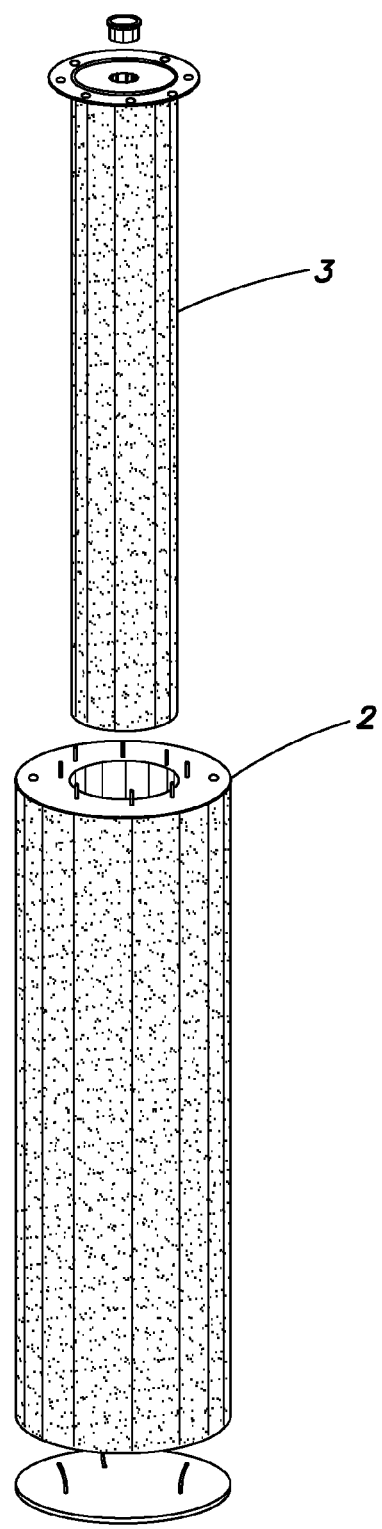
FIG. 19B is a partially exploded view of internal components of the radial flow filtration column of FIG. 17A.

FIG. 17A, FIG. 17B, and FIG. 17C illustrate an embodiment of a device of the present invention, with the location of the annular media bed 4 shown in broken lines and with an waste water inlet 120 and an filtrate outlet 24 located on a same side of the device. FIG. 18A, FIG. 18B, and FIG. 18C show further details of the device, including a head cartridge aligner 27 and a bottom cartridge aligner 29 used to maintain the annular media bed 4 in a central location within the column. FIG. 19A and FIG. 19B show an exploded view of the device, with FIG. 19A showing the outer assembly and FIG. 19B showing the media bed and screens. Details such as the inflatable bladder are not shown in FIGS. 17-19.

EXAMPLE

Performance of a radial flow column constructed and operated in accordance with an embodiment of the present invention (referred to herein as the "RFC" column) was compared with that of an axial flow column.

The RFC column was 70 mm high with a diameter of 110 mm and a single annular media bed with a height of 40 mm, an inner diameter of 20 mm, and an outer diameter of 60 mm. The RFC column was operated in inside-out filtration flow mode. The various media used in the RFC column in the tests described below had an average diameter of about 90 μm±10 μm, with media particle diameters ranging from about 90 μm to about 250 μm.

The axial flow column had a media bed with a height of 330 mm and a diameter of 12.5 mm. The various media used in the axial flow column in the tests described below had particle diameters of between about 0.5 mm to about 1.0 mm.

Figure 20:
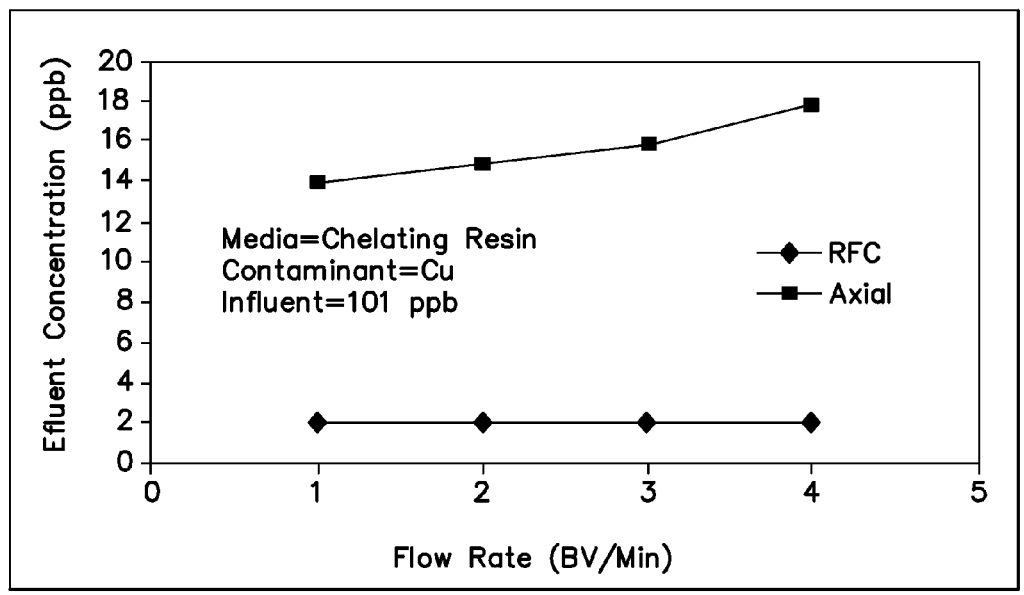
FIG. 20 is a chart of copper removal performance versus flow rate for a radial flow filtration column in accordance with an embodiment of the present invention and for a prior art axial flow column.

Copper Removal Performance:

Both the RFC column and the axial flow column were filled with a same chelating resin. The chelating resin was packed in the RFC column at a pressure of about 25 psig. An influent comprising water contaminated with 101 ppb of copper was introduced into both columns at various flow rates (measured in bed volumes/minute (BV/min)), and the amount of copper remaining in the effluent from the columns was measured using ICP-OES (inductively coupled plasma-optical emission spectrometry). The results of this test are illustrated in FIG. 20. As can be seen, the RFC column removed copper from the influent to a level of about 2 ppb in the effluent for flow rates ranging from 1 to 4 bed volumes/minute. In contrast, the axial flow column removed copper down to only about 14 ppb in the effluent at a flow rate of 1 bed volume/minute, with the removal performance decreasing with increased flow rate.

This test indicates that the RFC column performed better with regard to removing copper from a contaminated water stream than the axial flow column, and that the RFC column could be operated at a higher flow rate than the axial flow column without the copper removal performance decreasing significantly.

Figure 21:
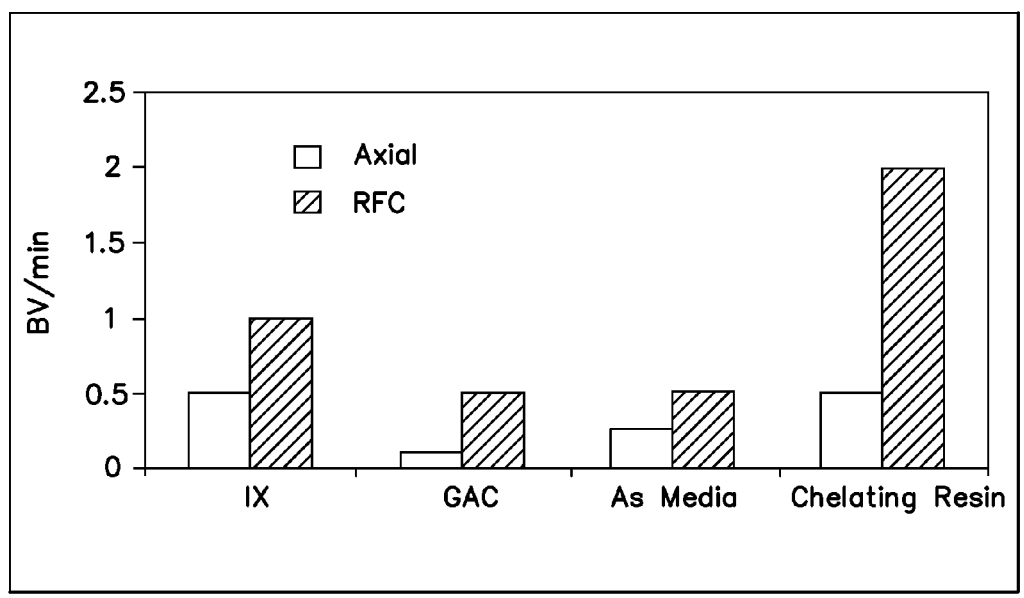
FIG. 21 is a chart of filtration flow rate with different types of resin for a radial flow filtration column in accordance with an embodiment of the present invention and for a prior art axial flow column.

Flow Rate Comparison:

Both the RFC column and the axial flow column were operated with a water influent pressure of about 1 psig to about 2 psig. The two columns were each filled with different filtration medias, including an IX media (a media including both cation and anion exchange resins), granular activated carbon (GAC), an arsenic adsorbing media, and a chelating resin. Each of the medias was packed in each of the columns with a packing pressure of zero psig. The flow rate of water through the two columns at a pressure of between about 1 psig and about 2 psig was then compared. The results are shown in FIG. 21. As can be seen, the RFC column exhibited higher flow rates for each of the medias than the axial flow column. For example, the RFC column exhibited a flow rate of about 1 bed volume/minute using the IX media, while the axial flow column exhibited a flow rate of 0.5 bed volumes/minute using the IX media.

These results indicate that the RFC column could be operated at a higher throughput for a given influent pressure than the axial flow column, and therefore could be operated more energy efficiently than the axial flow column.

Long Term Performance:

The long term performance for mercury and arsenic removal for the RFC column was compared with that for the axial flow column.

Figure 22A:
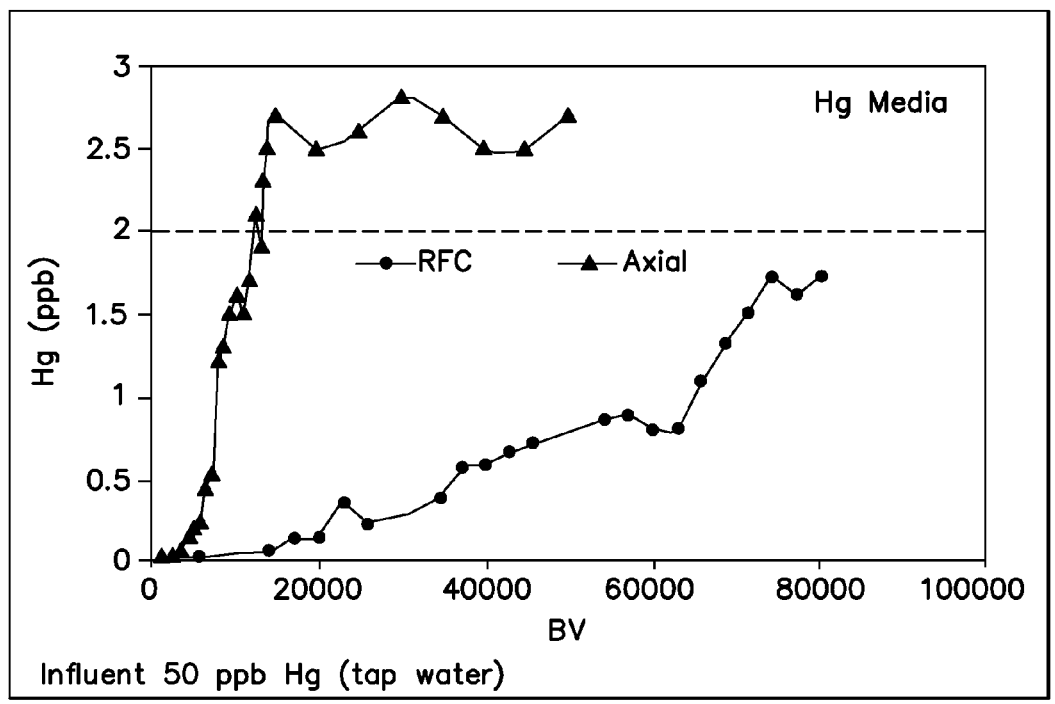
FIG. 22A is a chart of long term performance with regard to mercury removal for a radial flow filtration column in accordance with an embodiment of the present invention and for a prior art axial flow column.

For the mercury removal test, influent water contaminated with 50 ppb mercury was supplied to both columns, which were filled with the same mercury removal media. The media was packed in the RFC column at a pressure of about 25 psig. The axial flow column was operated at a flow volume of 0.5 bed volumes/minute, while the RFC column was operated at 2 bed volumes/minute. The two columns were operated at different rates to illustrate that the RFC column could operate as well or better than the axial flow column even at a higher filtration rate. Mercury levels in the effluent of each column were measured using ICP-OES and plotted against cumulative filtration volume. The results of this test are illustrated in FIG. 22A. As can be seen, the residual mercury in the effluent increased with filtered water volume for both columns. The increase in residual mercury in the column effluent with increasing filtered volume was more gradual for the RFC column than for the axial flow column. The RFC column exhibited less than 2 ppb mercury in the effluent stream even after filtering 80,000 bed volumes of water. In contrast, a level of 2 ppb mercury in the effluent of the axial flow column was reached after significantly less than 20,000 bed volumes of water had been filtered.

Figure 22B:
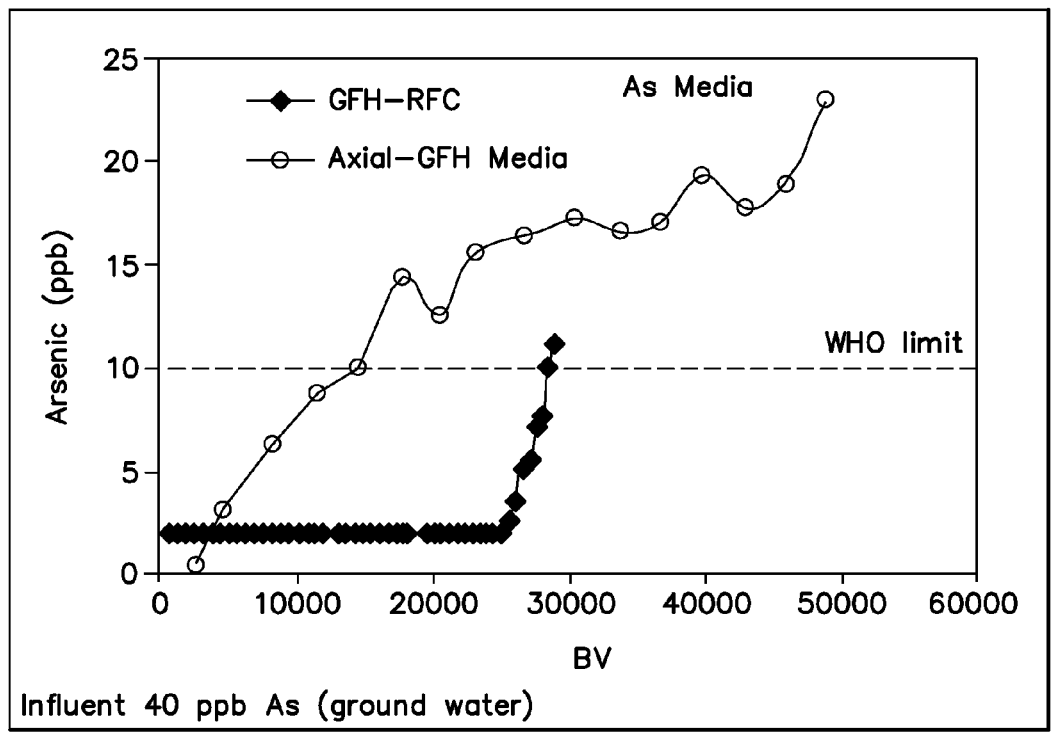
FIG. 22B is a chart of long term performance with regard to arsenic removal for a radial flow filtration column in accordance with an embodiment of the present invention and for a prior art axial flow column.

For the arsenic removal test, influent water contaminated with 40 ppb arsenic was supplied to both columns, which were filled with the same arsenic removal media. The media was packed in the RFC column at a pressure of about 25 psig. The axial flow column was operated at a flow volume of 0.5 bed volumes/minute, while the RFC column was operated at 1 bed volume/minute. Arsenic levels in the effluent of each column were measured using ICP-OES and plotted against cumulative filtration volume. The results of this test are illustrated in FIG. 22B. As can be seen, the residual arsenic in the effluent increased with filtered water volume for both columns. The residual arsenic in the effluent from the RFC column remained substantially constant, at about 2 ppb, until after about 25,000 bed volumes had been filtered, at which point the residual arsenic levels increased, presumably due to exhaustion of the arsenic removal media. The RFC column exhibited less than 10 ppb arsenic (the World Health Organization limit for arsenic contamination in drinking to water) in the effluent stream even after filtering about 25,000 bed volumes of water. In contrast, a arsenic level of 10 ppb in the effluent of the axial flow column was reached after less than about 15,000 bed volumes of water had been filtered.

The above results show that the RFC filtration column was capable of filtering contaminants such as mercury and arsenic from a greater quantity of water than the axial flow column before residual levels of these contaminants in the effluent stream increased to an undesirable level.

Filtration Capacity Comparison

Figure 23:
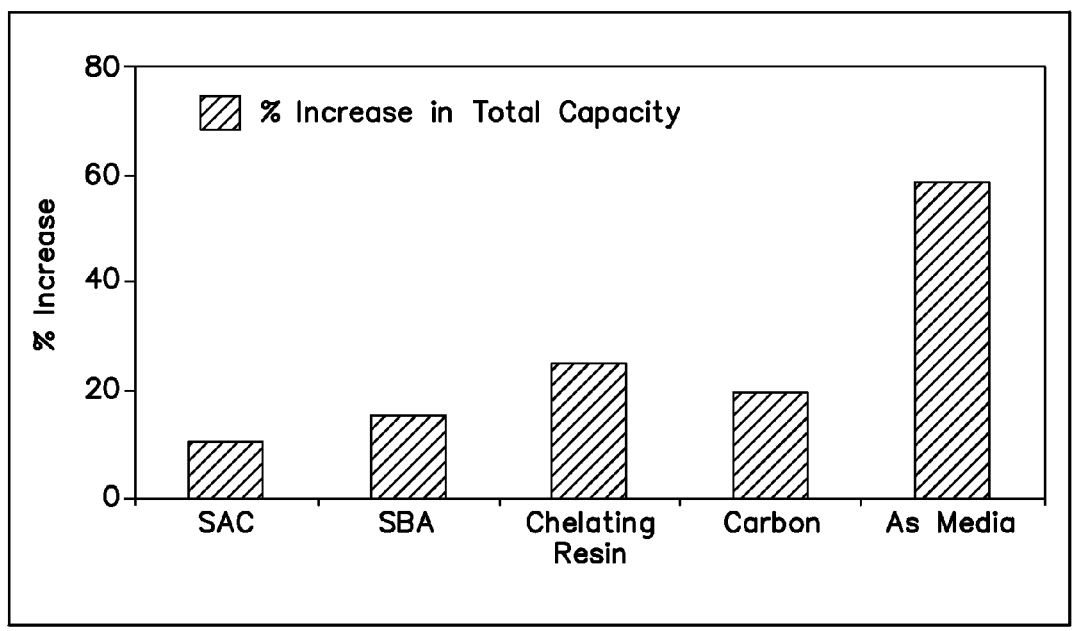
FIG. 23 illustrates the increased filtration capacity of a radial flow filtration column in accordance with an embodiment of the present invention as compared to an exemplary axial flow column.

Testing was performed to determine the filtration capacity of the RFC column as compared to the axial flow column for various media types including SAC media (a strong acid cation exchange resin used to remove calcium from water in this test), SBA media (a strong base anion exchange resin used for removal of nitrate from water in this test), chelating resin (Lewatit® TP 207 weakly acidic, macroporous cation exchange resin, with chelating iminodiacetate groups, available from Lanxess Engineering Company, Maharashtra, India, used to remove copper from water in this test), granular activated carbon (used to remove copper from water in this test), and As removal media. Both the RFC column and the axial flow column were run until breakthrough for each of the media types. After breakthrough, the media used was removed from the two columns and the contaminant concentration in the solid phase was measured. The contaminant concentration was measured by removing a known weight of dried media from the columns, acid digesting the media in accordance with EPA method 3050B, and analyzing the acid digested media for target ions using ICP-OES. The results are illustrated in FIG. 23, which shows that the RFC column has a filtration capacity of between about 10% (for the SAC media) and about 60% (for the AS media) greater than the axial flow column.

These results can be explained because the relatively smaller media used in the RFC column as compared to axial flow column (90 μm±10 μm diameter media for the RFC column and 0.5 mm to about 1.0 mm diameter media for the axial flow column) had a greater surface area, and thus a greater capacity for adsorbing contaminants. The RFC column was able to operate with smaller media then the axial flow column due to the lower pressure drop exhibited in the RFC column as compared to the axial flow column and the corresponding reduction in potential for channeling.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A radial flow column comprising:
   a fluid chamber defined by a side wall, a first end wall, and a second end wall;
   an inner permeable retainer positioned in the fluid chamber;
   a fluid inlet defined in one of the first end and the second end wall of the fluid chamber, the fluid inlet in fluid communication with a lumen centrally located within the fluid chamber and defined radially inward of the inner permeable retainer, the fluid inlet configured and arranged to introduce fluid to be treated in the radial flow column into the lumen;

an outer permeable retainer positioned in the fluid chamber spaced apart from and surrounding the inner permeable retainer;
a fluid outlet defined in one of the side wall and the second end wall of the fluid chamber, the fluid outlet in fluid communication with a volume of the fluid chamber defined radially outward of the outer permeable retainer;
a media bed compartment formed between the inner permeable retainer and the outer permeable retainer;
a media bed disposed within the media bed compartment; and
an inflatable bladder biased into the media bed compartment and configured to maintain a predetermined packing density of the media bed.

2. The radial flow column of claim 1, wherein the inner permeable retainer and the outer permeable retainer are concentric.

3. The radial flow column of claim 1, wherein the fluid inlet is a first inlet defined in the first end wall of the radial flow column at a first end of the lumen, the radial flow column further including a second fluid inlet defined in the second end wall of the radial flow column at a second end of the lumen.

4. The radial flow column of claim 1, wherein the bladder extends across a space bounded by the inner permeable retainer and the outer permeable retainer.

5. The radial flow column of claim 1, wherein the bladder is internally pressurized by a fluid introduced into a cavity of the bladder though a conduit in fluid communication with the cavity to maintain sealing engagement with an upper surface of the media bed.

6. The radial flow column of claim 5, wherein the bladder is internally pressurized to a pressure greater than a working pressure of the radial flow column.

7. The radial flow column of claim 1, wherein the media bed includes a sorbent and a filtration aid.

8. The radial flow column of claim 7, wherein the filtration aid has a lower density than the sorbent.

9. The radial flow column of claim 8, wherein the filtration aid is formed from a diatomaceous earth.

10. The filtration unit of claim 7, wherein the media bed includes the sorbent and the filtration aid in a ratio of about 1:1 by weight.

11. The radial flow column of claim 7, wherein the sorbent is a heavy metal sorbent.

12. The radial flow column of claim 1, wherein the bladder is an annular flexible bladder.

13. The radial flow column of claim 1, comprising multiple inflatable bladders biased into the media bed compartment.

14. A method of facilitating removal of a contaminant from a contaminated fluid comprising:
providing a radial flow column including
a fluid chamber defined by a side wall, a first end wall, and a second end wall;
an inner permeable retainer positioned in the fluid chamber;
a fluid inlet defined in one of the first end and the second end wall of the fluid chamber, the fluid inlet in fluid communication with a lumen centrally located within the fluid chamber and defined radially inward of the inner permeable retainer, the fluid inlet configured and arranged to introduce fluid to be treated in the radial flow column into the lumen;
an outer permeable retainer positioned in the fluid chamber spaced apart from and surrounding the inner permeable retainer;
a fluid outlet defined in one of the side wall and the second end wall of the fluid chamber, the fluid outlet in fluid communication with a volume of the fluid chamber defined radially outward of the outer permeable retainer;
a media bed compartment formed between the inner permeable retainer and the outer permeable retainer;
a media bed disposed within the media bed compartment; and
an inflatable bladder biased into the media bed compartment and configured to maintain a predetermined packing density of the media bed.

15. A method of treating a fluid containing at least one contaminant species comprising:
providing a source of a fluid containing at least one contaminant species;
connecting the source of fluid to a fluid inlet of a radial flow column, the radial flow column including
a fluid chamber defined by a side wall, a first end wall, and a second end wall;
an inner permeable retainer positioned in the fluid chamber, the fluid inlet defined in one of the first end and the second end wall of the fluid chamber, the fluid inlet in fluid communication with a lumen centrally located within the fluid chamber and defined radially inward of the inner permeable retainer;
an outer permeable retainer positioned in the fluid chamber spaced apart from and surrounding the inner permeable retainer and defining an outer chamber between the outer permeable retainer and the side wall;
a fluid outlet defined in one of the side wall and the second end wall of the fluid chamber, the fluid outlet in fluid communication with a volume of the fluid chamber defined radially outward of the outer permeable retainer;
a media bed compartment formed between the inner permeable retainer and the outer permeable retainer;
a media bed disposed in the media bed compartment; and
an inflatable bladder biased into the media bed compartment and configured to maintain a predetermined packing density of the media bed;
passing the fluid from the fluid inlet into the lumen;
passing the fluid radially outwardly from the lumen through the media bed and into the outer chamber to produce decontaminated fluid; and
removing the decontaminated fluid from the outer chamber.

16. The method of claim 15, further comprising introducing the fluid at both a first end and a second end of the lumen.

17. A radial flow filtration column comprising:
a tubular housing including a cylindrical side wall, an first end plate closing a first end of the cylindrical sidewall, and a second end plate closing a second end of the cylindrical sidewall;
an outer cylindrical screen concentrically disposed within the tubular housing, a first end of the outer cylindrical screen being sealed to the first end plate and a second end of the outer cylindrical screen being sealed to the second end plate, the outer cylindrical screen spaced apart from an inner surface of the cylindrical side wall to form an annular outlet chamber surrounding the outer cylindrical screen;
an inner cylindrical screen concentrically disposed within the outer cylindrical screen, a first end of the inner cylindrical screen being sealed to the first end plate and a second end of the inner cylindrical screen being sealed to the second end plate, the inner cylindrical screen spaced apart from the outer cylindrical screen to form an annular filter media chamber between the inner cylindrical screen and the outer cylindrical screen, and to form a cylindrical inlet chamber defined within an interior of the inner cylindrical screen;
a bed of granular filter media disposed within the annular filter media chamber;
an inlet passage extending into the inlet chamber through one of the first end plate and the second end plate;
an outlet passage extending into the outlet chamber through one of the second end plate and the cylindrical side wall;
a toroid-shaped bladder disposed within the annular filter media chamber adjacent the first end plate, a lowermost surface of the toroid-shaped bladder engaging an uppermost surface of the bed of granular filter media; and
a conduit extending through the first end plate and into the toroid-shaped bladder, the conduit configured and arranged to introduce a fluid under pressure into an interior of the toroid-shaped bladder to pressurize an interior space of the toroid-shaped bladder and to bias a lowermost surface of the toroid-shaped bladder against an uppermost surface of the bed of granular filter media to maintain a predetermined packing density of the bed of granular filter media.

* * * * *